United States Patent
Singh

(10) Patent No.: US 11,854,130 B2
(45) Date of Patent: Dec. 26, 2023

(54) METHODS, APPARATUS, SYSTEMS, DEVICES, AND COMPUTER PROGRAM PRODUCTS FOR AUGMENTING REALITY IN CONNECTION WITH REAL WORLD PLACES

(71) Applicant: InterDigital VC Holdings, Inc., Wilmington, DE (US)

(72) Inventor: Mona Singh, Cary, NC (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/113,716

(22) PCT Filed: Jan. 24, 2015

(86) PCT No.: PCT/US2015/012797
§ 371 (c)(1),
(2) Date: Jul. 22, 2016

(87) PCT Pub. No.: WO2015/112926
PCT Pub. Date: Jul. 30, 2015

(65) Prior Publication Data
US 2017/0011538 A1    Jan. 12, 2017

Related U.S. Application Data

(60) Provisional application No. 61/931,225, filed on Jan. 24, 2014.

(51) Int. Cl.
*G06T 11/60* (2006.01)
*G06K 9/00* (2006.01)
(Continued)

(52) U.S. Cl.
CPC .............. *G06T 11/60* (2013.01); *G06F 3/147* (2013.01); *G06V 20/10* (2022.01)

(58) Field of Classification Search
None
See application file for complete search history.

(56) References Cited

U.S. PATENT DOCUMENTS 8,743,145 B1 * 6/2014 Price ..................... G06T 19/006
345/629
8,890,896 B1 * 11/2014 Tseng ................... G06T 7/0018
340/435
(Continued)

FOREIGN PATENT DOCUMENTS

JP    2003-015626 A    1/2003
JP    2003-248844 A    9/2003
(Continued)

OTHER PUBLICATIONS

WO 2014-098033 A1, Abstract only; Cited in official action dated Oct. 17, 2017 in related Japanese patent application No. 2016-548316.
(Continued)

*Primary Examiner* — Kyle Zhai
(74) *Attorney, Agent, or Firm* — Condo Roccia Koptiw LLP

(57) ABSTRACT

Methods, apparatus, systems, devices, and computer program products directed to augmenting reality with respect to real-world places, and/or real-world scenes that may include real-world places may be provided. Among the methods, apparatus, systems, devices, and computer program products is a method directed to augmenting reality via a device. The method may include capturing a real-world view that includes a real-world place, identifying the real-world place, determining an image associated with the real-world place familiar to a user of the device viewing the real-world view, and/or augmenting the real-world view that includes the
(Continued)

real-world place with the image of the real-world place familiar to a user viewing the real-world view.

18 Claims, 12 Drawing Sheets

(51) Int. Cl.
*G06F 3/147* (2006.01)
*G06V 20/10* (2022.01)

(56) References Cited

U.S. PATENT DOCUMENTS

| | | | |
|---|---|---|---|
| 2003/0126035 A1 | 7/2003 | Kake et al. | |
| 2003/0156140 A1* | 8/2003 | Watanabe | G06F 3/0482 715/810 |
| 2003/0187844 A1* | 10/2003 | Li | G06F 16/583 |
| 2005/0028104 A1* | 2/2005 | Apparao | G06F 17/30035 715/738 |
| 2006/0139318 A1* | 6/2006 | Kariathungal | G06F 3/013 345/156 |
| 2006/0242139 A1* | 10/2006 | Butterfield | G06F 16/93 |
| 2007/0255754 A1* | 11/2007 | Gheel | G06F 16/9535 |
| 2008/0046175 A1* | 2/2008 | Tengler | G01C 21/3647 701/414 |
| 2008/0301106 A1* | 12/2008 | Oral | G06F 17/30696 |
| 2009/0237328 A1 | 9/2009 | Gyorfi et al. | |
| 2011/0141141 A1* | 6/2011 | Kankainen | H04N 5/272 348/E7.001 |
| 2011/0292076 A1 | 12/2011 | Wither et al. | |
| 2012/0135784 A1* | 5/2012 | Lee | G06K 9/00624 455/556.1 |
| 2012/0148091 A1* | 6/2012 | Kansal | G01C 21/20 382/100 |
| 2012/0229647 A1* | 9/2012 | Calman | G08B 21/24 348/158 |
| 2012/0327119 A1 | 12/2012 | Woo et al. | |
| 2013/0110666 A1 | 5/2013 | Aubrey et al. | |
| 2013/0147837 A1 | 6/2013 | Stroila | |
| 2013/0339868 A1* | 12/2013 | Sharpe | G06F 3/04817 715/739 |
| 2014/0002643 A1* | 1/2014 | Aziz | H04M 1/72522 348/143 |
| 2014/0247281 A1* | 9/2014 | Ellenby | G06T 19/006 345/633 |
| 2014/0253743 A1* | 9/2014 | Loxam | H04N 5/232 348/207.1 |
| 2015/0153933 A1* | 6/2015 | Filip | G06F 16/58 715/838 |

FOREIGN PATENT DOCUMENTS

| | | |
|---|---|---|
| JP | 2006-259788 A | 9/2006 |
| JP | 2008-273497 A | 11/2008 |
| JP | 2010-257253 A | 11/2010 |
| JP | 2011-022662 A | 2/2011 |
| JP | 2011-128977 A | 6/2011 |
| JP | 2011-170682 A | 9/2011 |
| JP | 2011-204047 A | 10/2011 |
| JP | 2012-118882 A | 6/2012 |
| JP | 2013-083689 A | 5/2013 |
| JP | 2013-097799 A | 5/2013 |
| JP | 2013-109469 A | 6/2013 |
| JP | 2013-217808 A | 10/2013 |
| JP | 5346115 B1 | 11/2013 |
| JP | 2014-232922 A | 12/2014 |
| KR | 10-2012-0049058 A | 5/2012 |
| KR | 10-2013-0000160 A | 1/2013 |
| KR | 2013-0000160 A | 1/2013 |
| WO | WO 2014-098033 A1 | 6/2014 |

OTHER PUBLICATIONS

JP 2003-015626 A, Machine translation included; Cited in official action dated Oct. 17, 2017 in related Japanese patent application No. 2016-548316.

JP 2013-083689 A, Machine translation included; Cited in official action dated Oct. 17, 2017 in related Japanese patent application No. 2016-548316.

JP 2014-232922 A, Abstract only; Cited in official action dated Oct. 31, 2017 in related Korean patent application No. 10-2016-7023231.

\* cited by examiner

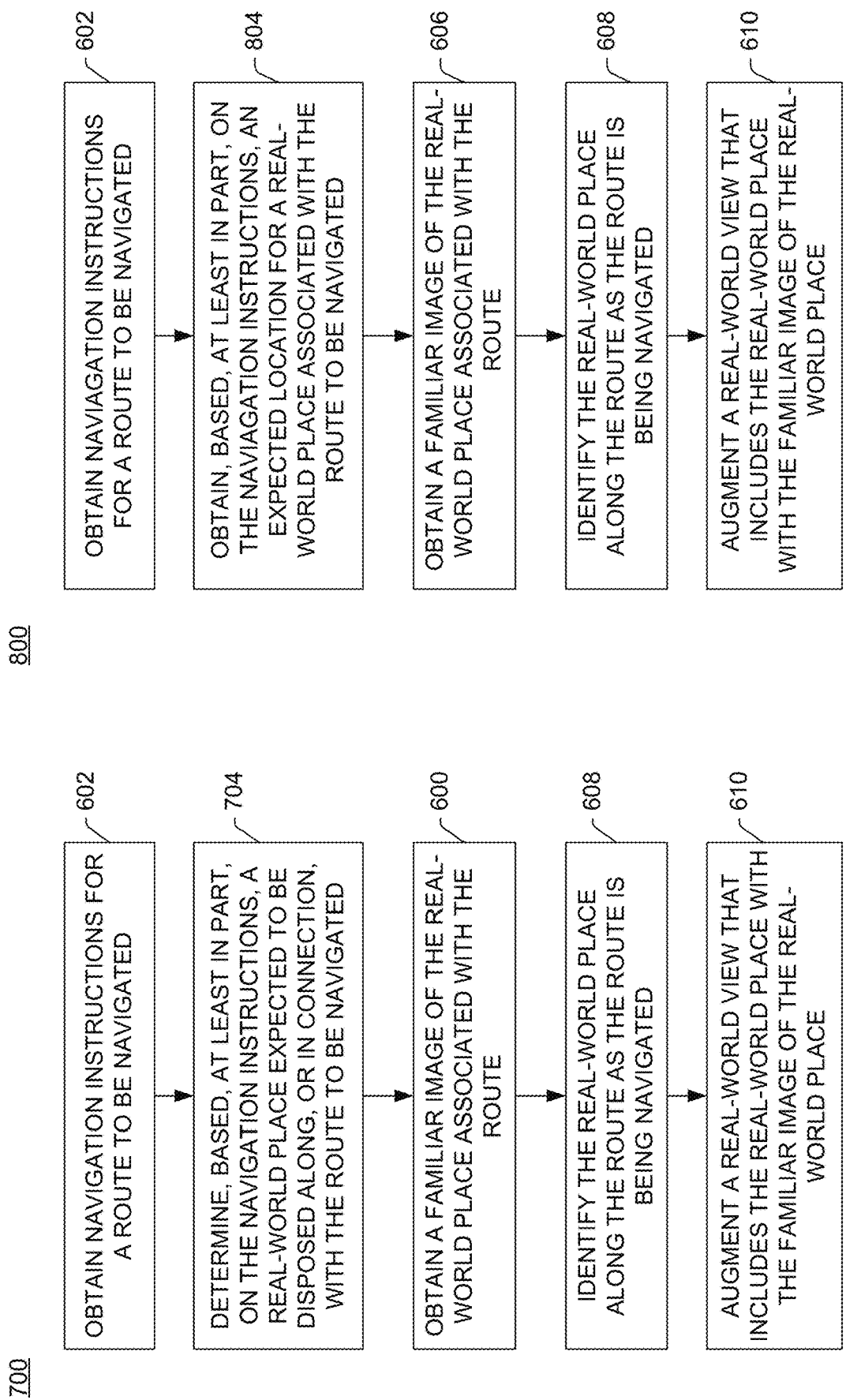

METHODS, APPARATUS, SYSTEMS, DEVICES, AND COMPUTER PROGRAM PRODUCTS FOR AUGMENTING REALITY IN CONNECTION WITH REAL WORLD PLACES

CROSS REFERENCE TO RELATED APPLICATIONS

This application is the National Stage Entry under 35 U.S.C. § 371 of Patent Cooperation Treaty Application No. PCT/US15/12797, filed Jan. 24, 2015, which claims the benefit of the U.S. Provisional Application No. 61/931,225, filed Jan. 24, 2014, the disclosure of which is incorporated herein by reference in their entirety and this application claims priority to these prior applications.

BACKGROUND

Augmented reality (AR) typically focuses on combining real world and computer-generated data, such as, by blending augmentation information and real-world footage, for display to an end user, generally in real or near-real time. The scope of AR has expanded to broad application areas, such as advertising, navigation, and entertainment to name a few. There is increasing interest in providing seamless integration of augmentation information into real-world scenes.

However, AR may present challenges such as new challenges for end user experience, and in particular, for appropriately displaying the augmentation information especially in view of its use with wearable devices or computers, navigation devices, smartphones, and/or the like and/or display footprint limitations associated with such devices. Further, current methods or techniques for displaying data on such devices, unfortunately, may not be suitable or thought out. For example, current methods or techniques for displaying augmentation information may be particularly problematic as a large number of images may be becoming available to users of applications on devices such as mobile phones or devices, wearable devices, computers, and/or the like. Unfortunately, users of the devices may have a limited cognitive ability and may not able to process the available images.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIGS. 6-9 are flow diagram illustrating example flows directed to augmenting reality via a presentation unit.

DETAILED DESCRIPTION

Figure 1B:
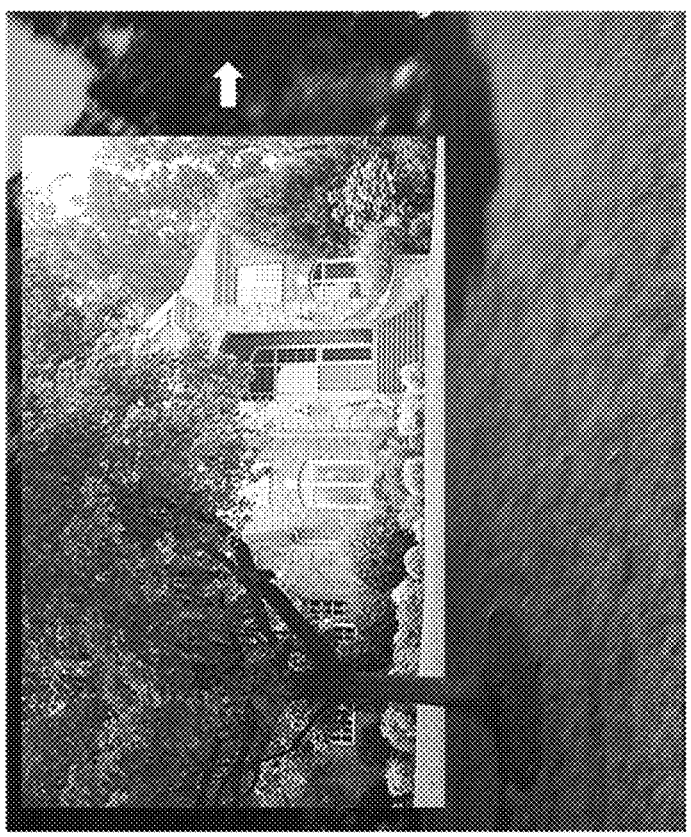
FIGS. 1A-1B illustrate an example of augmenting a real-world view that includes a real-world place with a familiar image of the same.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (e.g., provided) herein.

Examples herein may include and/or provide methods, apparatus, systems, devices, and/or computer program products related to augmented reality. In an example, the methods, apparatus, systems, devices, and computer program products may be directed to augmenting reality with respect to a real-world place, and/or a real-world view that may include the real-world place (e.g., by way of an augmented-reality presentation and/or user interface). The real-world place may be, for example, a landmark, a point of interest (POI), a building, and/or the like. The real-world place may have a fixed location (e.g., a landmark), or a location that may change (e.g., from time to time). The real-world place may be located along, or otherwise disposed in connection with, a route, path, and/or being navigated and/or being traversed according to examples.

According to examples described herein, view and/or real-world view (e.g., that may collectively be referred to as real-world view) may include and/or may be a view of a physical space. The real-world view may be viewable or otherwise perceivable on a device, for example, via (e.g., on, through, and/or the like) a presentation unit (e.g., a display). The real-world view may include one or more of the real-world places and/or augmentation information presented in connection with any of the real-world places. The augmentation information may be presented, rendered, and/or displayed via the presentation unit, for example, such that the augmentation information may appear to be located or otherwise disposed within the physical space. The augmentation information, for example, may be projected into the physical space (e.g., using holographic techniques and/or the like). Alternatively and/or additionally, the augmentation information may be presented (e.g., displayed) such that the augmentation information may be provided and/or may appear to be located or otherwise disposed on a display screen a device by the presentation unit. In various examples, some of the augmentation information may be projected into (or otherwise displayed to appear in) the physical space, and some of the augmentation information may be presented (e.g., rendered or displayed) such that the augmentation information may be provided and/or may appear to be located or otherwise disposed on the display screen.

The methods, apparatus, systems, devices, and computer program products may include a method directed to augmenting reality (e.g., via the device and/or a presentation unit therein). The method may include one or more of the following: capturing a real-world view via a device, identifying a real-world place in the real-world view, determining an image associated with the real-world place familiar to a user, and/or augmenting the real-world view that includes the real-world place with the image of the real-world place familiar to the user or viewer that may be viewing the real-world view and/or anticipated to view the real-world view (e.g., where the real-world view may be augmented by displaying or rendering the image on, over, or near the real-world place as described herein). For example, a real-world place that may be familiar to the user or viewer can be made to appear familiar to the viewer. The image of the real-world place familiar to the viewer (e.g., that may be a familiar image) may cause or enable the viewer to recognize the real-world place when the user might not otherwise. For example, the real-world place that may be depicted in the real-world view may not look familiar to the user or viewer due to the current visit to the real-world place occurring during nighttime hours, and/or previous visits to (and/or previous views of) the real-world place occurring during daylight hours. Alternatively and/or additionally, the real-world place depicted in the real-world view may not look familiar to the viewer as a result of not visiting (and/or viewing) the real-world place for an extended period of time, and/or during such time, the real-world place and/or its surroundings have changed (e.g., beyond recognition of the user or viewer).

The image (e.g., familiar image) may be familiar such as directly familiar to the viewer; for example, as a consequence of and/or responsive to a device of the viewer capturing the image during a prior visit to (e.g., presence at or near) the real-world place. The image may be captured autonomously (e.g., automatically and/or without user interaction or action) and/or via user interaction such as by explicit action of the viewer. According to an example, the familiar image may be indirectly familiar to the viewer; i.e., as a consequence of a (e.g., online) social relationship with another person whose device captured the image during a prior visit to the real-world place by such member of the viewer's social circle. The image may be captured by the device of the member of the viewer's social circle autonomously and/or by explicit action of the member of the viewer's social circle as described herein.

In some examples, augmenting the real-world view may include presenting and/or providing (e.g., displaying and/or rendering) the image in connection with the real-world place. Presenting and/or providing the image may include presenting the image in a call out (e.g., a virtual object) in connection with the real-world place, such as, for example, anchored, positioned proximate, adjacent to, and/or the like to the real-world place. Alternatively and/or additionally, presenting and/or the image may include projecting and/or superimposing the image onto the real-world view. Superimposing the image may include overlaying the image onto (e.g., at least a portion of) the real-world place and/or making the image appear as a substitute for the real-world place.

In examples, the method may include augmenting the real-world view with multiple images (e.g., multiple familiar images). According to an example, the images may be presented and/or provided in a format akin to a slide show. For example, one of the images may be presented and/or provided, and then replaced by another one of the familiar images responsive to expiration of a timer and/or to input from the viewer.

The methods, apparatus, systems, devices, and computer program products provided herein may be implemented as follows according to examples. For example, a user of a device (e.g., Alice) may plan to drive to a friend's place on a rainy winter evening. His or her friend's place may be in a particular area, location or municipality and/or a portion thereof (e.g., a downtown district of a nearby town). In an example, the downtown district may be undergoing a revival, and gaining additional residents. Alice may also plan to pick up goods such as beverages, food, and/or the like (e.g., a bottle of wine) at store such as a small wine store in the same area. By the time the user departs, it may begin to get dark and the rain may continue unabated. While the user has visited his or her friend's house just a few months prior, the user may not have visited the store before. The user may use a navigation system. The user's navigation system may provide him or her with directions that may be seemingly accurate directions, but the neighborhood may be unfamiliar. Although the user may have been there before, his or her prior visits to such neighborhood may have occurred on bright spring days in the afternoon. Moreover, there may have been new construction in the area. As such, his or her friend's place and/or landmarks he or she may have used for making turns (e.g., a grocery store's parking lot, the big rock at one of the street corners, and/or any other landmark) may be or may appear unfamiliar.

In examples herein, the store such as the wine store may be or may be identified as an intermediate destination along a route to the friend's place. The store may be a small outfit in the upper story of a low building and lies in the middle of a long line of small mom and pop stores according to an example. The store may also have a narrow entrance on the street level.

As the user approaches the store, in examples herein, images of the same store and its entrance taken by others may be obtained and/or displayed on a device the user may be using such as a mobile phone or device, navigation device, a wearable device, and/or the like as described herein. The images may include some images taken by people such as Alice's friend who may live in the area and/or other people that may travel to the area or that may have visited the store. In an example, the images (e.g., familiar images) that may have been taken by the user's friends, in particular, may indicate to her that her friends have been there before, and as such, may increase the user's level of comfort of approaching the store (e.g., in the dark or at a particular time of day).

When the store appears in the user's field of view, the store may be identified within the view (e.g., discriminated, or otherwise differentiated, from other objects in view). This may include, for example, determining an outline of the entrance to the store. After identifying the entrance to the store, the images of the entrance previously captured by people such as the user's friends may be substituted for or imposed (e.g., or otherwise displayed or rendered on the device of the user) near the entrance appearing in the current view. Seeing the images (e.g., some of which may have been taken in the daytime and/or during other seasons) on the device that may be familiar may assist the user in identifying the store entrance from among the nearby stores. Further, according to an example, seeing the images on the device that may have better lighting may increase the user's level of comfort to enter the store.

As the user may continue along the route, the user's friend's place or location may be recognized or identified as a destination along the route. One or more images (e.g., images that may be familiar of the user's friend's house that may have been previously captured, for example, by the user or another person or people, based on the user's gaze or the user taking a picture when he or she may have previously visited it)) may be obtained and/or displayed or rendered on the device via the presentation unit according to an example.

Figure 1A:

When the user's friend's place (e.g., the location or residence such as the house of the friend of the user) may appear in the user's field of view (e.g., on the device), the user's friends place may be recognized and/or identified within the view (e.g., discriminated, or otherwise differentiated, from other objects in view). This may include determining an outline of the friend's place in an example. After identifying the user's friend's house, the images of the user's friend's house may be substituted for the friend's house appearing in the current view of the device the user may be interacting with or using. FIGS. 1A-1B illustrate an example of augmenting a real-world view that includes a user's friend's house (a real-world place) with an image that may be familiar (e.g., previously captured and/or recognized by the user or provided by people or other user's such as friends of the user) of the same. Seeing the image (i.e., the previously captured images from a spring afternoon) may cause or enable the user to recognize his or her friend's house or location. As shown in FIG. 1A, a real-world view 2 that may be captured by a device, for example, may have a real-world place 4 therein. According to an example (e.g., as shown in FIG. 1B), an image 6 may be overlaid on the real-world place 4 in the real-world view 2 such that the user may see the real-world place 4 via the image 6 in a manner familiar to him or her as described herein such that the user may recognize the real-world place 4 in the real-world view 2. Additionally, seeing the image may also facilitate a user locating a driveway or other location to park (e.g., where he or she may have been instructed to park, for example, which may be shown by arrow 7).

According to another example, a user (e.g., John) may be visiting a popular location in a city (e.g., Times Square in New York City (Manhattan)) from another location (e.g., from North Carolina). This may be his or her first trip to the city. While visiting, the user may want to meet up with a group of friends who live in the area. The group may meet once a month at a particular restaurant (e.g., Tony's Italian Restaurant). The user may have seen pictures of it on a social media application or site (e.g., Facebook, Twitter, Instagram, and/or the like) and other people may discuss or talk about the restaurant. Unfortunately, the user may have trouble or a tough time locating the restaurant.

Figure 2B:
FIGS. 2A-2B illustrate an example of augmenting a real-world view that includes a real-world place with a familiar image of the same.
Figure 2A:

FIGS. 2A-2B illustrate another example of augmenting a real-world view that includes a real-world place (i.e., the restaurant) with an image that may be shown of the same. A real-time or real-world view 6 of the location (e.g., Times Square) may be shown in FIG. 2A (e.g., that may be on the device of the user). As shown in FIG. 2B, the real-time or real-world view 8 of the location may be augmented (e.g., on the device of the user) with an image 9 that may be familiar to the user (e.g., namely, an image of the restaurant that may have been taken by a friend and posted on a social media site). The user may have seen the image 9, which may facilitate or cause the user to recognize, and in turn, locate the restaurant using the device of the user.

Figure 3:
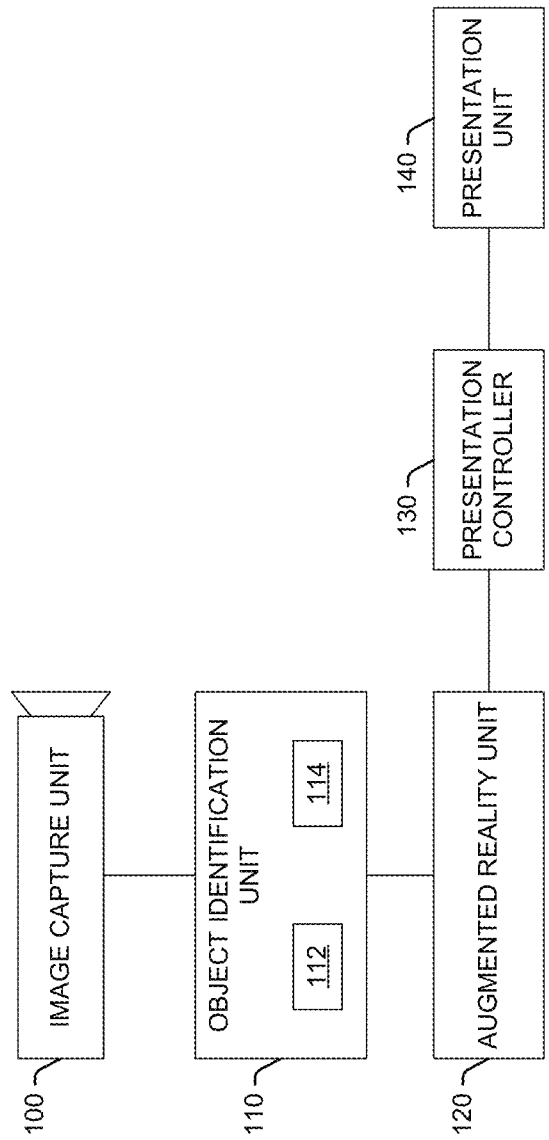
FIG. 3 is a block diagram illustrating an example of an augmented reality system.

FIG. 3 is a block diagram illustrating an example of an augmented reality system 10 in accordance with at least some embodiments described herein. The augmented reality system 10 may be used and/or implemented in a device. The device may include a device that may receive, process and present (e.g., display) information. In examples as described herein, the device may be a wearable computer; a smartphone; a wireless transmit/receive unit (WTRU), such as described with reference to FIGS. 10A-10E (e.g., as described herein, for example, below), another type of user equipment (UE), and/or the like. Other examples of the device may include a mobile device, personal digital assistant (PDA), a cellular phone, a portable multimedia player (PMP), a digital camera, a notebook, and a tablet computer, a vehicle navigation computer (e.g., with a heads-up display). In examples, the device may include a processor-based platform that may operate on a suitable operating system, and/or that may be capable of executing the methods and/or systems described herein including, for example, software that may include the methods and/or systems.

The augmented reality system 10 may include an image capture unit 100, an object identification unit 110, an augmented reality unit 120, a presentation controller 130 and a presentation unit 140. The image capture unit 100 may capture (e.g., or receive) a real-world view, and/or may provide or send the captured real-world view to other elements of the augmented reality system 10, including, for example, the object identification unit 110 and/or the augmented reality unit 120. The image capture unit 100 may be, or include, one or more of a digital camera, a camera embedded in a device such as a mobile device, a head mounted display (HMD), an optical sensor, an electronic sensor, and the like.

The object identification unit 110 may receive the captured real-world view from the image capture unit 100, and may identify, recognize, and/or determine (e.g., carry out a method, process or routine to identify, determine, and/or recognize) a real-world place disposed in the captured real-world view. The object identification unit 110 may include an object recognition unit 112 and a spatial determination unit 114. The object recognition unit 112 and/or a spatial determination unit 114 may facilitate identifying the real-world place.

The object recognition unit 112 may perform object detection (e.g., may determine and/or detect landmarks, objects, locations, and/or the like) on the real-world view. Using object detection, the object recognition unit 112 may detect and/or differentiate the real-world place or location from other objects disposed within the real-worlds view. The object recognition unit 112 may use any of various known technical methodologies for performing the object detection, including, for example, edge detection, primal sketch, change(s) in viewing direction, changes in luminosity and color, and/or the like.

The spatial determination unit 114 may determine real-world and/or localized map locations for the detected or determined real-world place (or real-world location). The spatial determination unit 114 may use a location recognition algorithm (e.g., methods and/or techniques). The location recognition algorithm used may include a Parallel Tracking and Mapping (PTAM) method and/or a Simultaneous Localization and Mapping (SLAM) method, and/or any other suitable method or algorithm (e.g., that may be known in the art). The spatial determination unit 114 may obtain and use positioning information (e.g., latitude, longitude, attitude, and/or the like) for determining the real-world and/or localized map location for the detected real-world place. The positioning information may be obtained from a global position system (GPS) receiver (not shown) that may be communicatively coupled to the augmented reality system 10, object identification unit 110 and/or the spatial determination unit 114, and/or via network assistance (such as, from any type of network node of a network or interface (self-organizing or otherwise)).

The augmented reality unit 120 in connection with the presentation controller 130 and/or the presentation unit 140 may augment the real-world view (e.g., may display and/or render an image associated with the real-world place on the real-world view as described herein). For example, the augmented reality unit 120 in connection with the presentation controller 130 and/or the presentation unit 140 may augment the real-world view with one or more images (e.g., images that may be familiar to a viewer viewing the real-world view and/or anticipated to view the real-world view). The augmented reality unit 120 may obtain and/or receive the images from the image capture unit 100 such as a camera that may capture the image, social media sites or application, applications on the device, and/or the like. For example, the images may be received via applications such as WhatsApp, Facebook, Instagram, Twitter and/or, the like. In some examples, the images may include or may be images on the internet may also be familiar to users. An example of these images on the internet that may be familiar may be images in news items that the user may have read. The augmented reality unit 120 may generate configuration information (e.g., parameters) for formatting, and generating presentation of, the images, for example, on the display of the device. The formatting may include augmenting the entire view or part of a view. For example, it determines the size, shape, and brightness, and alignment. The augmented reality unit 120 may provide or send the images and corresponding configuration information to the presentation controller 130. The presentation controller 130 may obtain or receive the images and corresponding configuration information from the augmented reality unit 120. The presentation controller 130 may, based at least in part on the configuration information, modify the familiar images for presentation via the presentation unit 140. The presentation controller 130 may provide or send the images, as translated, to the presentation unit 140.

The presentation unit 140 may be any type of device for presenting visual and/or audio presentation. The presentation unit 140 may include a screen of a device and/or a speaker or audio output. The presentation unit 140 may be or may include any type of display, including, for example, a windshield display, wearable device (e.g., glasses), a smartphone screen, a navigation system, and/or. One or more user inputs may be received by, through and/or in connection with user interaction with the presentation unit 140. For example, a user may input a user input or selection by and/or through touching, clicking, drag-and-dropping, gazing at, voice/speech recognition and/or other interaction in connection with the real-world view (e.g., augmented or otherwise) presented via the presentation unit 140.

The presentation unit 140 may receive the images from the presentation controller 130. The presentation unit 140 may apply (e.g., project, superimpose, overlay, and/or the like) the familiar images to the real-world view.

Figure 4:
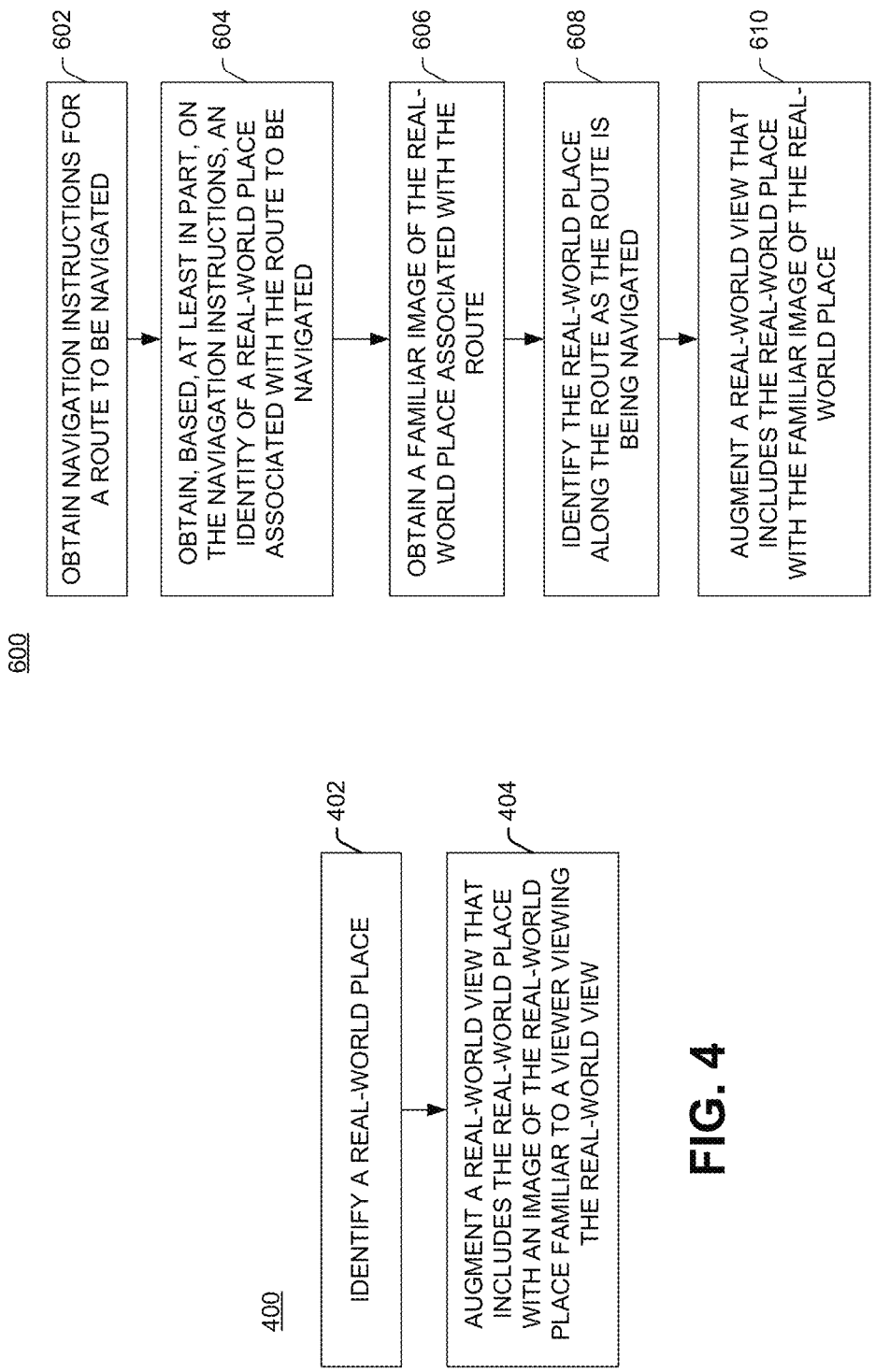
FIG. 4 is a flow diagram illustrating example flow directed to augmenting reality via a presentation unit.

FIG. 4 is a flow diagram illustrating example method 400 for augmenting reality on a device (e.g., via a presentation unit) according to examples herein. The method 400 may be implemented in the augmented reality system of FIG. 3 and/or may be described with reference to the system thereof. The method 400 may be carried out using other architectures, as well.

At 402, a device (e.g., the object identification unit 110 of the system of FIG. 3 that may be implemented in a device) may identify a real-world place. According to an example, the real-world place may be disposed along and/or in connection with a route, path, and/or the like being navigated and/or being traversed. At 404, the device (e.g., the augmented reality unit 120 in connection with the presentation controller 130 and/or the presentation unit 140 that may be implemented in the device) may augment a real-world view that may include the real-world place with an image that may be familiar.

The device, for example, via the presentation unit 140 may, in some examples, present (e.g., display and/or render) the image (e.g., that may be familiar) in connection with the real-world place. According to an example, the device via the presentation unit 140 may present the image in a call out in connection with the real-world place, such as, for example, anchored, positioned proximate, and/or the like to the real-world place. Alternatively and/or additionally, the device via the presentation unit 140 may project and/or superimpose the image onto the real-world view. The device via the presentation unit 140 may overlay the familiar image onto (at least a portion of) the real-world place and/or make the familiar image appear as a substitute for the real-world place.

Although not shown, device, for example, via the augmented reality unit 120 may obtain and/or receive the image (e.g., that may be familiar) from one or more repositories. These repositories may be located locally to, or remote from, the device (e.g., that may implement or include the augmented reality system 10 of FIG. 3). According to an example, the augmented reality unit 120 may determine which image may be augmented on the real world-view. For example, the augmented reality unit 120 may use a metric or score to determine whether an image that may be obtained and/or received (e.g., from the repositories) may include the real-world place in the real-world view and/or whether the image should be augmented in view of the real-world place in the real-world view (e.g., rendered and/or displayed thereon as described herein). As an example, the image may be obtained and/or received based on a metric or score that reflects and/or expresses an amount, degree and/or level of familiarity (e.g., a familiarity score). For example, the image that may be familiar to a user may be obtained and/or received from one or more of the repositories by selecting an image and/or if or when an image may have a familiarity score above a threshold. The familiarity score may be determined (e.g., calculated) on the fly, and/or stored in connection with (e.g., as an index to) the image. In some examples, the familiar image may be stored in memory in connection with it's calculated familiarity score and/or a determination may be made as to whether the image may be associated with the real-world place and/or may be augmented on the real-world view (e.g., on the real-world place).

The familiarity score may be based (e.g., calculated) on one or more factors. In some examples, the familiarity score may be based, at least in part, on the image (e.g., that may be familiar to the user or the familiarity image) being captured during a prior visit of the viewer to real-world place and/or the image being similar to the real-world place. The capturing of such image may be made autonomously (e.g., automatically or without interaction from a user or view), or pursuant to an explicit action of a user or view viewer (e.g., explicitly taking the image). In some examples, the familiarity score may be based, at least in part, on a social relationship between the user and a person whose device captured the image (e.g., the user and the person whose device captured the image may be friends on a social media site, and/or the like).

The familiarity score may be based, at least in part, on an amount of times and/or occasions the user may have viewed the image. Further, in an example, the familiarity score may be based, at least in part, on an amount of time spent by the user viewing the image. The familiarity score may be based, at least in part, on an amount of times and/or occasions the user may have interacted with the image. The familiarity score may be based, at least in part, on an amount of time spent by the user interacting with the image. The familiarity score may be based, at least in part, on an amount of times and/or occasions the user interacted with media associated with and/or displaying the image. The familiarity score may be based, at least in part, on an amount of time spent by the user with media associated with and/or displaying the image. The familiarity score may be based, at least in part, on an amount of times and/or occasions the user may have interacted with media associated with the image after viewing the image. The familiarity score may be based, at least in part, on an amount of time spent by the user with media associated with the image after viewing the image.

The familiarity score may be based, at least in part, on one or more environmental conditions occurring when the image may have been captured according to an example. The environmental conditions that may have occurred during or when the image may have been captured may include one or more of the following: lighting, weather, time of day, season, and/or the like. The familiarity score may be based, at least in part, on one or more environmental conditions occurring when the image may have been captured and on one or more environmental conditions occurring when the user may be viewing the real-world view. For example, the familiarity score may be based, at least in part, on a difference (or similarity of) between one or more environmental conditions occurring when the familiar image may have been captured and on one or more environmental conditions occurring if or when the viewer may be viewing the real-world view. The environmental conditions occurring if or when the viewer may be viewing the real-world view may include one or more of the following: lighting, weather, time of day, season, and/or the like.

The familiarity score may be based, at least in part, on one or more qualities of the image (e.g., the image that may be familiar or the familiar image). The qualities may include one or more of a subjective quality (e.g., sharpness) and an objective quality (e.g., contrast). The qualities may include one or more image characteristics, such as, for example, noise (e.g., that may be measured, for example, by signal-to-noise ratio), contrast (e.g., including, for example, optical density (degree of blackening) and/or luminance (brightness)), sharpness (or unsharpness), resolution, color, and/or the like.

After obtaining or receiving the image, the augmented reality unit 120 may generate configuration information (e.g., parameters) for formatting, and generating presentation of, the image. The configuration information may include instructions for presenting the image in a call out (e.g., a virtual object) in connection with the real-world place, such as, for example, anchored, positioned proximate, adjacent, and/or the like to the real-world place.

Alternatively and/or additionally, the configuration information may include instructions for projecting and/or superimposing the familiar image onto the real-world view. The configuration information may include, for example, instructions for sizing (or resizing) and/or positioning the familiar image in connection with projecting and/or superimposing the image onto the real-world view. These instructions may be based, at least in part, on information that may be received or obtained from the object identification unit 110 pursuant to the object identification unit 110 identifying the real-world place disposed in the real-world view.

The augmented reality unit 120 may provide the images and corresponding configuration information to the presentation controller 130. The presentation controller 130 may obtain or receive the images (e.g., from the image capture unit 110) and corresponding configuration information from the augmented reality unit 120. The presentation controller 130 may, based at least in part on the configuration information, modify the images in terms of size, shape, sharpness, and/or the like for presentation via the presentation unit 140. The presentation controller 130 may provide or send the images, as translated, to the presentation unit 140. The presentation unit 140 may receive the images from the presentation controller 130. The presentation unit 140 may apply, provide, and/or output (e.g., project, superimpose, and/or the like) the images to the real-world view.

Although not shown, the augmented reality system 10 may include a field-of-view determining unit. The field-of-view determining unit may interface with the image capture unit 100 and/or a user tracking unit to determine whether the real-world place disposed in real-world view may be within a field of view of a user. The user tracking unit may be, for example, an eye tracking unit.

According to an example, the eye tracking unit employs eye tracking technology to gather data about eye movement from one or more optical sensors, and/or based on such data, track where the user may be gazing and/or may make user input determinations based on various eye movement behaviors. The eye tracking unit may use any of various known techniques to monitor and track the user's eye movements.

The eye tracking unit may receive inputs from optical sensors that face the user, such as, for example, the image capture unit 100, a camera (not shown) capable of monitoring eye movement as the user views the presentation unit 140, and/or the like. The eye tracking unit may detect the eye position and the movement of the iris of each eye of the user. Based on the movement of the iris, the eye tracking unit may make various observations about the user's gaze. For example, the eye tracking unit may observe and/or determine saccadic eye movement (e.g., the rapid movement of the user's eyes), and/or fixations (e.g., dwelling of eye movement at a particular point or area for a certain amount of time).

The eye tracking unit may generate one or more inputs by employing an inference that a fixation on a point or area (collectively "focus region") on the screen of the presentation unit 140 may be indicative of interest in a portion of the real-world view underlying the focus region. The eye tracking unit, for example, may detect a fixation at a focus region on the screen of the of the presentation unit 140, and generate the field of view based on the inference that fixation on the focus region may be a user expression of designation of the real-world place.

In an example, the eye tracking unit may generate one or more of the inputs by employing an inference that the user's gaze toward, and/or fixation on a focus region corresponding to, one of the virtual objects is indicative of the user's interest (or a user expression of interest) in the corresponding virtual object. Inputs indicating an interest in the real-world place may include a location (e.g., one or more sets of coordinates) associated with the real-world view.

With reference again to FIG. 4, the device that may implement the augmented reality system 10 via the augmented reality unit 120 (e.g., in connection with the presentation controller 130 and/or the presentation unit 140) may augment the real-world view on condition that the real-world place may be within the field of view. Alternatively or additionally, the device via the augmented reality unit 120 (e.g., in connection with the presentation controller 130 and/or the presentation unit 140) may augment the real-world view for a field of view that may be determinable from, and/or based, on user input. In various examples, the device using for example the augmented reality unit 120 (in connection with the presentation controller 130 and/or the presentation unit 140) may augment the real-world view for a field of view that may be determinable from, and/or based, on input associated with a user gaze.

Figure 5:
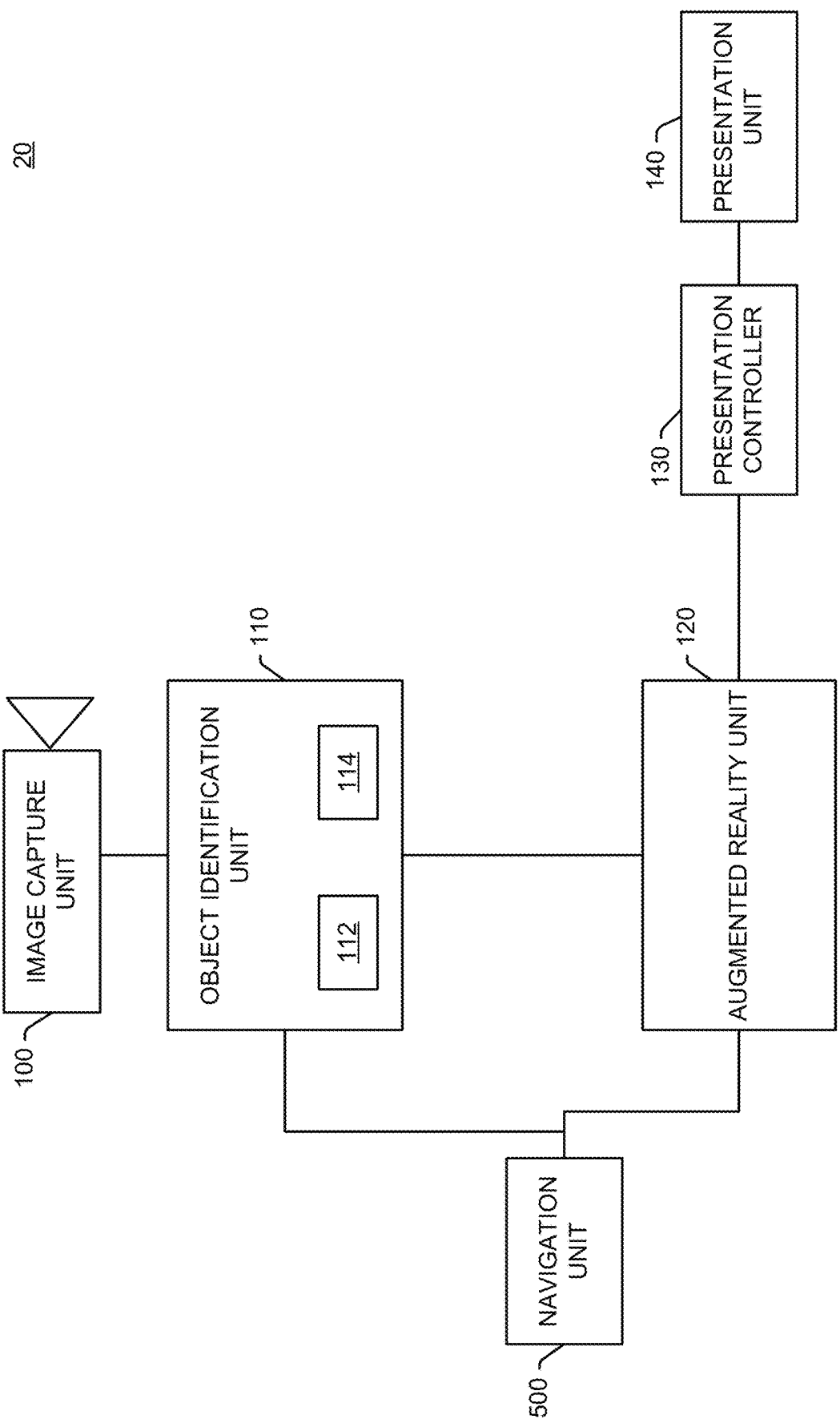
FIG. 5 is a block diagram illustrating an example of an augmented reality system.

FIG. 5 is a block diagram illustrating an example of an augmented reality system 20 in accordance with at least some embodiments described herein. The augmented reality system 20 may be used and/or implemented in a computing device. The augmented reality system 20 of FIG. 5 may be similar to the augmented reality system 10 of FIG. 3 (e.g., except as described herein). The augmented reality system 20 may include an image capture unit 100, a navigation unit 500, an object identification unit 110, an augmented reality unit 120, a presentation controller 130 and a presentation unit 140.

The navigation unit 500 may generate directions and/or navigations instructions (e.g., navigation instructions) for a route to be navigated. This navigation unit may track progress along the route, and/or may make adjustments to the route. The adjustments to the route may be based, and/or condition, on current position, traffic environmental conditions (e.g., snowfall, rainfall, and/or the like), updates received about the knowledge of route (e.g., destination or different way points), and/or any other suitable conditions and/or parameters. The navigation unit 500 may provide the navigation instructions to the object identification unit 110 and/or the augmented reality unit 120. The object identification unit 110 may receive or obtain one or more (e.g., a set and/or list of) real-world places associated with the route to be navigated, based, at least in part, on the navigations instructions obtained from the navigation unit 500. The object identification unit 110 may identify the real-world places associated with the route to be navigated using a repository (not shown). The object identification unit 110 may, for example, query the repository using the navigation instructions. The repository may provide or send identities of the real-world places associated with the route to be navigated to the object identification unit 110 in response to the query.

According to an example, the repository may be, or include, in general, any repository or any collection of repositories that may include geo-references to (e.g., locations and/or real-world geographic positions of), and/or details of, real-world places disposed in connection with one or more spatial area of the earth. In various examples, the repository may be, or include, any of point cloud, point cloud library, and the like; any or each of which may include geo-references to, and/or details of, real-world places disposed in connection with one or more spatial area of the earth.

The details of a real-world place may include, for example, an indication that a real-world place may exist at the particular geo-reference to such place; an indication of type of place, such as, for example, a code indicating the particular type of place and/or the like. In some examples, the details of a real-world place may be limited to an indication that a real-world place exists at the particular geo-reference to such place. In such examples, additional details of the real-world places may be determined based on (e.g., deduced, inferred, etc. from) other data and/or corresponding geo-references in the sign repository. For example, one or more details of a real-world place may be deduced from the geo-reference to a real-world place being near (e.g., in close proximity to) a corner at a four-way intersection between two roads, an exit off a highway, an entrance onto a highway, and/or the like; and/or from the geo-reference to the real-world place being in a particular jurisdiction (e.g., country, municipality, etc.). Alternatively and/or additionally, additional details of the real-world place may be obtained or received from one or more repositories having details of the real-world place populated therein. The details may be populated into these repositories, for example, responsive to (e.g., the object identification unit 110) recognizing the real-world during or otherwise in connection with a previous navigation, and/or traversal of, locations and/or real-world geographic positions corresponding to the geo-reference to the sign. Alternatively and/or additionally, the details may be populated into the repositories responsive to user input. The user input may be entered in connection with a previous navigation, and/or traversal of, locations and/or real-world geographic positions corresponding to the geo-reference to the sign. According to an example, the user input may be entered responsive to viewing the real-world place in one or more images. Further, in an example, the details may be populated into the repositories responsive to recognizing the real-world place depicted in one or more images, and/or from one or more sources from which to garner the details (e.g., web pages).

The repository may be stored locally in memory of the computing device, and may be accessible to (e.g., readable and/or writable by) the processor of computing device. Alternatively and/or additionally, the repository may be stored remotely from the computing device, such as, for example, in connection with a server remotely located from the computing device. Such server may be available and/or accessible to the computing device via wired and/or wireless communication, and the server may serve (e.g., provide a web service for obtaining) the real-world places associated with the route to be navigated. The server may also receive from the computing device (e.g., the object identification unit 110), and/or populate the repository with, details of the real-world places.

The object identification unit 110 may pass the identities of the real-world places associated with the route to be navigated obtained from the repository to the augmented reality unit 120. The augmented reality unit 120 may obtain or receive (e.g., or determine) the identities of the real-world places associated with the route to be navigated from the object identification unit 110.

The augmented reality unit 120 may obtain or receive, for example, from one or more repositories, the images (e.g., that may be familiar or familiar images) of the real-world places associated with the route. Such repositories may be located locally to, or remote from, the augmented reality system 30. The images may be obtained or received, based on respective familiarity scores as described herein, for example.

The object identification unit 110 may receive a captured real-world view from the image capture unit 100, and/or may identify the real-world places associated with the route currently disposed in the captured real-world view. The augmented reality unit 120 in connection with the presentation controller 130 and/or the presentation unit 140 may augment the real-world view with one or more of the images obtained in connection with the real-world places associated with the route and currently disposed in the captured real-world view. The augmented reality unit 120 may generate configuration information (e.g., parameters) for formatting, and generating presentation of, the images. The augmented reality unit 120 may provide or send the images and corresponding configuration information to the presentation controller 130. The presentation controller 130 may obtain or receive the images and corresponding configuration information from the augmented reality unit 120. The presentation controller 130 may, based at least in part on the configuration information, translate the images for presentation via the presentation unit 140. The presentation controller 130 may provide the modified images, to the presentation unit 140. The presentation unit 140 may obtain or receive the familiar images from the presentation controller 130. The presentation unit 140 may apply, provide, or output (e.g., project, superimpose, render, present, and/or the like) the images to the real-world view.

FIG. 6 is a flow diagram illustrating example method 600 directed to augmenting reality via a presentation unit in accordance with an embodiment. The method 600 may be described with reference to the augmented reality system 20 of FIG. 5. The method 600 may be carried out using other architectures, as well (e.g., the augmented reality system 10 or 30 of FIG. 3 or FIG. 9, respectively).

At 602, the device that may implement the augmented reality system 20, for example, via the object identification unit 110 may obtain or receive navigations instructions for a route to be navigated. The device, for example, using or via the object identification unit 110 may obtain or receive the navigation instructions, for example, from the navigation unit 500. At 604, the object identification unit 110 may obtain or receive, based, at least in part, on the navigations instructions, a real-world place associated with the route to be navigated. The device, for example, via the object identification unit 110, for example, may receive or obtain an identity of the real-world place associated with the route to be navigated from a repository.

At 606, in an example, the device via, for example, the augmented reality unit 120 may receive or obtain a image (e.g., that may be familiar or the familiar image) of the real-world place associated with the route. The image may be received or obtained based on a corresponding familiarity score (e.g., as described herein). At 608, the device via, for example, the object identification unit 110 may identify the real-world place along the route as the route may be navigated. The device via, for example, the object identification unit 110 may also recognize real-world places other than the relevant real-world place (e.g., at 608). According to an example, the device (e.g., via the object identification unit 110) may provide the recognized real-world places, including the recognized relevant-real-world place, to the sign repositories for incorporation therein.

At 610, the device via, for example, the augmented reality unit 120 in connection with the presentation controller 130 and/or the presentation unit 140 may augment the real-world view with the image received obtained in connection with the real-world place associated with the route and currently disposed in the captured real-world view as described herein.

FIG. 7 is a flow diagram illustrating an example method 700 directed to augmenting reality via a presentation unit in accordance with an embodiment. The method 700 may be described with reference to the augmented reality system 20 of FIG. 5. The method 700 may be carried out using other architectures, as well (e.g., the augmented reality system 10 and/or 30 of FIGS. 3 and 9, respectively). The method 700 of FIG. 7 may be similar to the method 600 of FIG. 6, except as shown, at 704, the device via, for example, the object identification unit 110 may receive or obtain, based, at least in part, on the navigations instructions, a real-world place expected to be disposed along, or in connection, with the route to be navigated.

FIG. 8 is a flow diagram illustrating an example method 800 directed to augmenting reality via a presentation unit in accordance with an embodiment. The method 800 may be described with reference to the augmented reality system 20 of FIG. 5. The method 800 may be carried out using other architectures, as well (e.g., the augmented reality system 10 and/or 30 of FIGS. 3 and 9, respectively). The method 800 of FIG. 8 may be similar to the method 700 of FIG. 7, except as shown, at 804, the object identification unit 110 may receive or obtain, based, at least in part, on the navigations instructions, an expected location of the real-world place associated (e.g., or expected to be disposed along, or in connection) with the route to be navigated.

Figure 9:
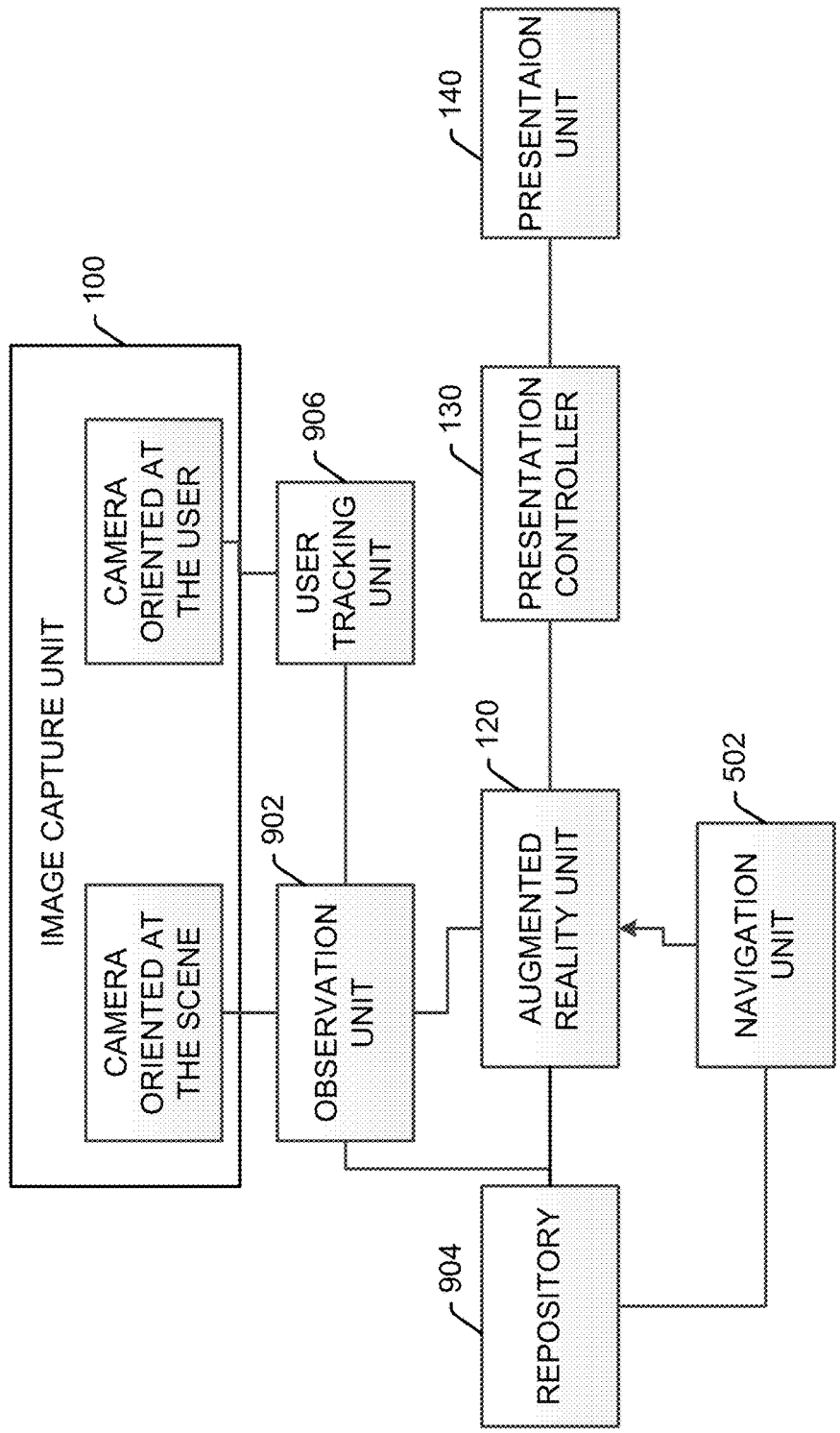

FIG. 9 is a block diagram illustrating an example of an augmented reality system 30 in accordance with at least some examples described herein. The augmented reality system 30 may be used and/or implemented in a device (e.g., similar to the augmented reality system 10 and/or 20 that may be implemented in a device) as described herein. The augmented reality system 30 may include an image capture unit 100, a navigation unit 502, an observation unit 902, a repository unit 904, a user tracking unit 906, an augmented reality unit 120, a presentation controller 130 and a presentation unit 140. The augmented reality system 30 of FIG. 9 may be similar to the augmented reality system 20 of FIG. 5 (e.g., except as described herein).

Operations or methods (e.g., such as the methods 200, 600, 700 and/or 800) that may be carried out in connection with the augmented reality system 30 of FIG. 9 may be as described herein as follows. Other operations or methods, including those described herein, may be carried out by the augmented reality system 30 of FIG. 9, as well.

In various examples, the user tracking unit 906 (e.g., that may be or may include an eye tracking unit) in connection with the image capture unit 100 may determine a real-world places present in a field of view. The user tracking unit 906, for example, in connection with the image capture unit 100 may carry out such determination, for example, if or when the user's position changes by a given number (e.g., 10 or any other suitable number) meters and/or every second.

The observation unit 902 may capture images from one or more cameras facing a scene. The observation unit 902 may capture relevant metadata from additional sensors, vehicle services, web services, and the like. Based on input from user tracking unit 904, the observation unit 902 may identify images that are present in the user's field of view. The observation unit 902 may receive or obtain identities of real-world places that may be provided or sent from navigation instructions issued by the navigation unit 904 (or via an object identification unit (not shown)). The observation unit 902 may associate information about the real-word places (e.g., metadata) along with the images that it obtains from image capture unit 100 oriented at the scene, including those images that correspond to the user's field of view.

The repository unit 904 may receive or obtain the images (and/or associated metadata) provided by the observation unit 902 and store them in a suitable database. In an example, this database may be locally resident (e.g., within a vehicle) or reside remotely, for example, to be accessed via a web service. The repository unit 904 may access public images along with images captured by (e.g., observation units of) users who may be members of user's social circle. The repository unit 904 may have access to an online social network in which the user participates (and/or may be compatible with privacy settings of that online social network).

The augmented reality unit 120 may include a selection unit and a query unit (not shown). The query unit may query the repository unit 904 to receive or obtain images (e.g., user-stored, public, or social). The query unit may generate queries based on requests from the augmented reality unit 110 and/or the navigation unit 502 to retrieve images corresponding to position and other current metadata. The images retrieved from the repository unit 904 may be received with associated metadata. The query unit may provide or send such information to the selection unit.

The selection unit may obtain images from the repository unit 904 by way of a query result carried out by the query unit using the identities of real-world places provided from navigation instructions issued by the navigation unit 904 (or via an object identification unit (not shown)) and/or familiarity scores for the images. The selection unit may select one or more of familiar images from among the images provided from the repository unit 902 based, at least in part, on the familiarity scores for the images (e.g., the images having familiarity scores above a threshold).

The augmented reality unit 120 in connection with the presentation controller 130 and/or the presentation unit 140 may augment the real-world view that includes the real-world place (e.g., within the field of view) using one or more of the selected images (e.g., that may be familiar or a familiar image). According to examples described herein, the augmented reality unit 120, presentation controller 130 and presentation unit 140 may carry out augmenting the real-world view with one or more familiar images of a real-world place whenever a new real-world place may be detected, a position of the projection of the real-world place in the field of view changes significantly (e.g., by a given number of (e.g., 5 and/or any other suitable number) angular degrees. To facilitate carrying out the augmentation, the augmented reality unit 120, presentation controller 130 and/or presentation unit 140 may determine where in the field of view the real-world place may appear based on tracking the user's eye gaze or another input such as a picture or location of a camera and/or a user's gaze based on the location or picture, including, for example, one or more of the following of: (i) a specific part of the user's glasses, and/or (ii) a specific part of the vehicle's windshield that the user is driving.

In examples, included among various procedures that may be carried out in connection with the augmented reality system 30 of FIG. 9 may include or may be a recording procedure and a presentation method or procedure.

As pursuant to the recording method or procedure, the observation unit 902 may capture images of real-world places where the user travels. The observation unit 902 may capture such images on an ongoing basis. By way of example, the observation unit 902 may capture the images when the user's position and/or user's gaze may change (e.g., significantly and/or if the position changes by 10 meters and the gaze angle changes by 10 degrees). Alternatively or additionally, the observation unit 902 may capture the images upon request from the user. The observation unit 902 may receive and/or obtain metadata corresponding to the images. This metadata may include, for example the user's position and orientation of gaze. The repository unit 904 may store the images along with the metadata.

According to an example (e.g., pursuant to the presentation method or procedure), a real-world place may be identified. Identification may occur, for example, if or when the navigation unit 502 indicates a sufficiently significant change in position (e.g., 10 meters), or alternatively, upon request from the user. To facilitate identifying the real-world place, the navigation unit 502 may determine a current position of the user, and the navigation unit 502 along with the augmented reality unit 102 may determine whether the current position may be within a specified distance of a currently active direction point (e.g., where the user may follow some direction) or destination, and/or a real-world place that may have been previously visited by the user and/or a member of the user's social circle.

In an example (e.g., if or when a real-world place may be identified), the augmented reality unit 102 may receive or obtain, pursuant to the query unit and the repository unit 904, images (or links to the images) for the identified real-world place. The obtained images may include images stored by the user, by a member of the user's social circle and/or from a public source.

According to an example, the selection unit may select one or more of the received or obtained images, and may do so based, at least in part, on respective familiarity scores as described herein. The selection unit may determine (e.g., calculate) each familiarity score based on a number of factors. In examples, the selection unit may compute the familiarity score for each image based on a sum or aggregation of weighted factors. The factors (e.g., that may be weighted with different values and/or may be used to compute or calculate the familiarity score based on the sum or aggregation thereof) may include one or more of the following: (i) whether the image may have been captured by the user's device during a previous visit to the real-world place; (ii) whether the image may have been captured by an explicit action of the user (e.g., by clicking a camera) during a previous visit to the real-world place; (iii) whether the user may have a social relationship with the person whose device captured the image; (iv) an amount of times/occasions the user has viewed the image; (v) an amount of time spent by the user viewing image; (vi) an amount of times/occasions the user interacted with the image; (vii) an amount of time that may have been spent by the user interacted with image; (viii) an amount of times and/or occasions the user interacted with media associated with and/or displaying the image; (ix) an amount of time spent by the user with media associated with and/or displaying the image; (x) an amount of times and/or occasions the user interacted with media associated with the image after viewing the image; (xi) an amount of time spent by the user with media associated with the image after viewing the image; (xii) one or more environmental conditions occurring if or when the image may have been captured; (xiii) a difference between (or similarity of) one or more environmental conditions occurring if or when the image may have been captured and on one or more environmental conditions occurring (e.g., when the user may be viewing the real-world view); (xiv) one or more qualities of the image, and/or the like.

In examples, the selection unit may compute the familiarity score in accordance with one or more of the following: (i) if the image may have been captured by the user's device during a previous visit to the real-world place, a weight may be (e.g., given or assigned) 1, otherwise the weight may be 0; (ii) if the image may have been captured by an explicit action of the user on a previous visit (e.g., by clicking a camera), a weight may be (e.g., given or assigned) 1, otherwise the weight may be 0; (iii) if the user may have a social relationship with the person whose device captured the image, then such factor may be given a weight ranging from 0 to 1 (e.g., based on an average of, or other nominalizing function that may be applied to, considerations, such as, friendship (weighted from 0 to 1), recency of last communication (weighted from 0 to 1), invitation to the currently relevant social event (weighted from 0 to 1), amount of communication in the last salient period (e.g., one month) (weighted from 0 to 1), and/or the like); (iv) a weight ranging from 0 to 1 based on the amount of times/occasions the user may have viewed the image (e.g., scaled upwards the more times and/or occasions the user views or may have viewed the image); (v) a weight ranging from 0 to 1, for example, based on the amount of time spent by the user viewing image (e.g., scaled upwards the more time spent by the user viewing image); (vi) a weight ranging from 0 to 1, for example, based on the amount of times/occasions the user interacted with the image (e.g., scaled upwards the more times and/or occasions the user may interact with the image); (vii) a weight ranging from 0 to 1, for example, based on the amount of time spent by the user interacting with image (e.g., scaled upwards the more time spent by the user interacting with image); (viii) a weight ranging from 0 to 1, for example, based on the amount of times and/or occasions the user may have interacted with media associated with and/or displaying the image (e.g., scaled upwards the more times/occasions the user interacts with the media); (ix) a weight ranging from 0 to 1, for example, based on the amount of time spent by the user with media associated with and/or displaying the image (e.g., scaled upwards the more time spent by the user interacting with the media); (x) a weight ranging from 0 to 1, for example based on the amount of times/occasions the user interacted with media associated with the image after viewing the image (e.g., scaled upwards the more time spent by the user interacting with image); (xi) a weight ranging from 0 to 1, for example, based on the amount of time spent by the user with media associated with the image after viewing the image (e.g., scale upwards the more time spent by the user interacting with the media); (xii) a weight ranging from 0 to 1, for example, based on the environmental conditions occurring if or when the image may have been captured such as based on an average of, or other nominalizing function applied to, considerations, such as, lighting (weighted from 0 to 1), weather (weighted from 0 to 1), time of day (weighted from 0 to 1), season (weighted from 0 to 1), and/or the like; (xiii) a weight ranging from 0 to 1, for example based on a difference between (or similarity of) one or more of the environmental conditions occurring if when the image may have been captured and on one or more the environmental conditions occurring when the user may be viewing the real-world view; and/or (xiv) a weight ranging from 0 to 1 based on one or more of the qualities of the image like brightness, sharpness, color quality, and/or the like.

After selecting the familiar images, the augmented reality unit 120 in connection with the user tracking unit 906 may determine a location on the presentation unit for presenting the selected familiar images. The augmented reality unit 120 may determine the location based on an outline of the real-world place (as currently visible) on the user's field of view. In some embodiments, the augmented reality unit 120 may identify an approximate location for presenting the familiar images.

The presentation controller 130 may transform the selected familiar images, as appropriate. The presentation controller 130 (and/or the augmented reality unit 120) in connection with the user tracking unit 906 may determine a current orientation of the user's eye gaze. The presentation controller 130 (and/or the augmented reality unit 120) may determine the orientation from which each selected image (e.g., that may be familiar or the familiar image) that may have been captured. The presentation controller 130 (and/or the augmented reality unit 120) may transform each selected image to approximate the current orientation and size.

The presentation unit 140 may present (e.g., display or render) one or more of the selected images (e.g., the images that may be familiar or the familiar images) in connection with the real-world view and/or the real-world place. The presentation unit 140 may, for example, present the image in a call out (e.g., a virtual object) in connection with the real-world place, such as, for example, anchored, positioned proximate, adjacent, and/or the like to the real-world place. Alternatively and/or additionally, the presentation unit 140 may project and/or superimpose the image onto the real-world view. Superimposing the image may include presentation unit 140 overlaying the familiar image onto (at least a portion of) the real-world place and/or making the familiar image appear as a substitute for the real-world place (e.g., as shown in FIGS. 1B and 2B and described herein).

In some embodiments, the augmented reality unit 130 in connection with the presentation controller 130 and/or presentation unit 140 may augment the real-world view with more than one of the selected images. These multiple images may be presented or displayed or rendered in a format akin to a slide show. For example, one of the familiar images may be presented, and then replaced by another one of the familiar images responsive to expiration of a timer and/or to input from the viewer. For example, each of multiple familiar images may be presented (e.g., in a priority order, for example, based on familiarity score) for a preset duration, (e.g., 3 seconds); rotating through the images, according to an example. Alternatively or additionally, each of the multiple familiar images may be presented (e.g., in a priority order, for example, based on familiarity score) until the user may request the next image.

The methods, apparatus, systems, devices, and computer program products provided herein are well-suited for communications involving both wired and wireless networks. Wired networks are well-known. An overview of various types of wireless devices and infrastructure is provided with respect to FIGS. 10A-10E, where various elements of the network may utilize, perform, be arranged in accordance with and/or be adapted and/or configured for the methods, apparatuses and systems provided herein.

FIGS. 10A-10E (collectively FIG. 10) are block diagrams illustrating an example communications system 1000 in which one or more disclosed embodiments may be implemented. In general, the communications system 1000 defines an architecture that supports multiple access systems over which multiple wireless users may access and/or exchange (e.g., send and/or receive) content, such as voice, data, video, messaging, broadcast, etc. The architecture also supports having two or more of the multiple access systems use and/or be configured in accordance with different access technologies. This way, the communications system 1000 may service both wireless users capable of using a single access technology, and wireless users capable of using multiple access technologies.

The multiple access systems may include respective accesses; each of which may be, for example, an access network, access point and the like. In various embodiments, all of the multiple accesses may be configured with and/or employ the same radio access technologies ("RATs"). Some or all of such accesses ("single-RAT accesses") may be owned, managed, controlled, operated, etc. by either (i) a single mobile network operator and/or carrier (collectively "MNO") or (ii) multiple MNOs. In various embodiments, some or all of the multiple accesses may be configured with and/or employ different RATs. These multiple accesses ("multi-RAT accesses") may be owned, managed, controlled, operated, etc. by either a single MNO or multiple MNOs.

The communications system 1000 may enable multiple wireless users to access such content through the sharing of system resources, including wireless bandwidth. For example, the communications systems 1000 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Figure 10A:
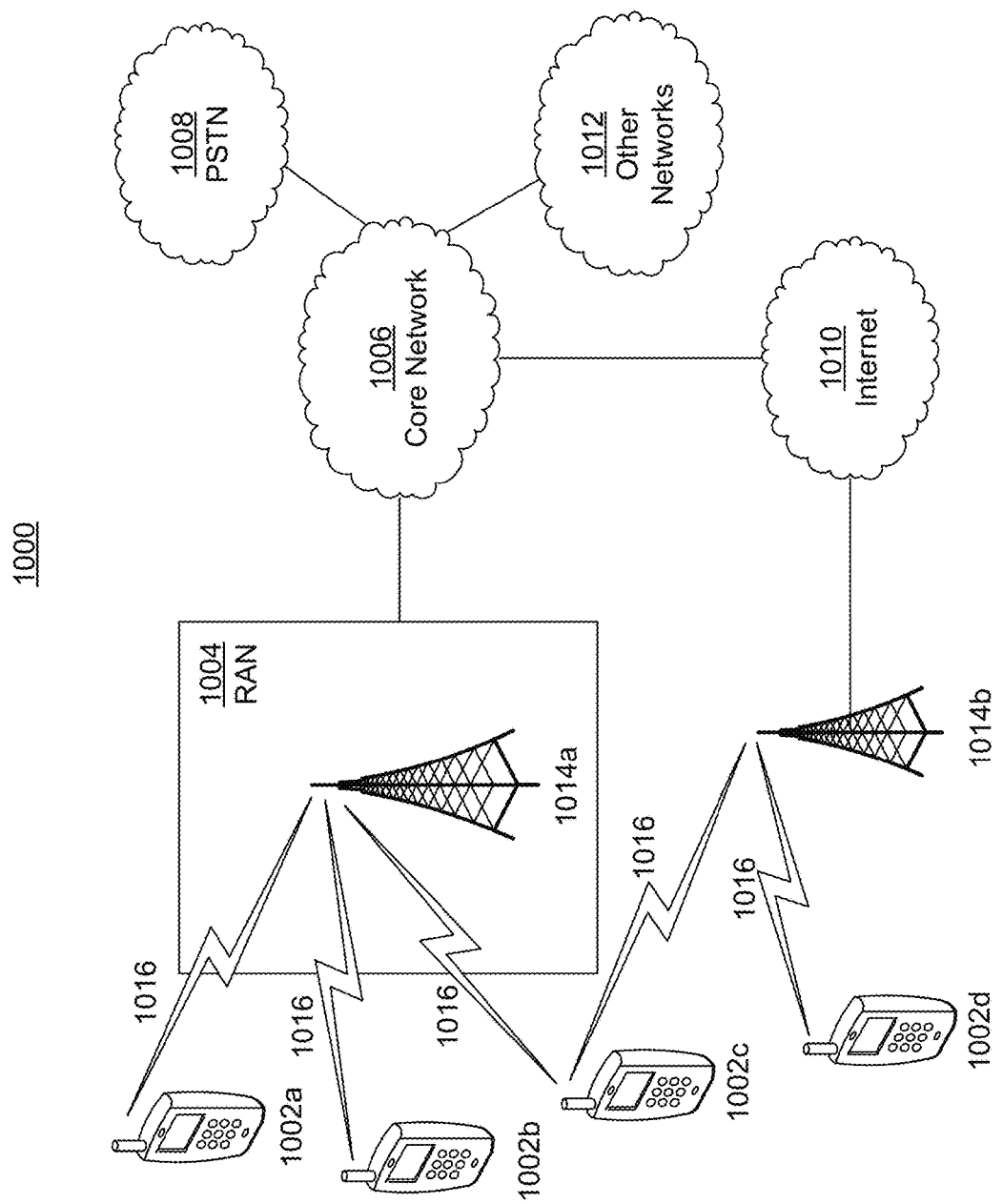
FIG. 10A is a system diagram of an example communications system in which one or more disclosed embodiments may be implemented.

As shown in FIG. 10A, the communications system 1000 may include wireless transmit/receive units (WTRUs) 1002a, 1002b, 1002c, 1002d, a radio access network (RAN) 1004, a core network 1006, a public switched telephone network (PSTN) 1008, the Internet 1010, and other networks 1012, though it will be appreciated that the disclosed embodiments contemplate any number of WTRUs, base stations, networks, and/or network elements. Each of the WTRUs 1002a, 1002b, 1002c, 1002d may be any type of device configured to operate and/or communicate in a wireless environment. By way of example, the WTRUs 1002a, 1002b, 1002c, 1002d may be configured to transmit and/or receive wireless signals, and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a terminal or like-type device capable of receiving and processing compressed video communications, or like-type device.

The communications systems 1000 may also include a base station 1014a and a base station 1014b. Each of the base stations 1014a, 1014b may be any type of device configured to wirelessly interface with at least one of the WTRUs 1002a, 1002b, 1002c, 1002d to facilitate access to one or more communication networks, such as the core network 1006, the Internet 1010, and/or the networks 1012. By way of example, the base stations 1014a, 1014b may be a base transceiver station (BTS), Node-B (NB), evolved NB (eNB), Home NB (HNB), Home eNB (HeNB), enterprise NB ("ENT-NB"), enterprise eNB ("ENT-eNB"), a site controller, an access point (AP), a wireless router, a media aware network element (MANE) and the like. While the base stations 1014a, 1014b are each depicted as a single element, it will be appreciated that the base stations 1014a, 1014b may include any number of interconnected base stations and/or network elements.

The base station 1014a may be part of the RAN 1004, which may also include other base stations and/or network elements (not shown), such as a base station controller (BSC), a radio network controller (RNC), relay nodes, etc. The base station 1014a and/or the base station 1014b may be configured to transmit and/or receive wireless signals within a particular geographic region, which may be referred to as a cell (not shown). The cell may further be divided into cell sectors. For example, the cell associated with the base station 1014a may be divided into three sectors. Thus, in one embodiment, the base station 1014a may include three transceivers, i.e., one for each sector of the cell. In another embodiment, the base station 1014a may employ multiple-input multiple output (MIMO) technology and, therefore, may utilize multiple transceivers for each sector of the cell.

The base stations 1014a, 1014b may communicate with one or more of the WTRUs 1002a, 1002b, 1002c, 1002d over an air interface 1016, which may be any suitable wireless communication link (e.g., radio frequency (RF), microwave, infrared (IR), ultraviolet (UV), visible light, etc.). The air interface 1016 may be established using any suitable radio access technology (RAT).

More specifically, as noted above, the communications system 1000 may be a multiple access system and may employ one or more channel access schemes, such as CDMA, TDMA, FDMA, OFDMA, SC-FDMA, and the like. For example, the base station 1014a in the RAN 1004 and the WTRUs 1002a, 1002b, 1002c may implement a radio technology such as Universal Mobile Telecommunications System (UMTS) Terrestrial Radio Access (UTRA), which may establish the air interface 1016 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1014a and the WTRUs 1002a, 1002b, 1002c may implement a radio technology such as Evolved UMTS Terrestrial Radio Access (E-UTRA), which may establish the air interface 1016 using Long Term Evolution (LTE) and/or LTE-Advanced (LTE-A).

In other embodiments, the base station 1014a and the WTRUs 1002a, 1002b, 1002c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1014b in FIG. 10A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1014b and the WTRUs 1002c, 1002d may implement a radio technology such as IEEE 802.11 to establish a wireless local area network (WLAN). In another embodiment, the base station 1014b and the WTRUs 1002c, 1002d may implement a radio technology such as IEEE 802.15 to establish a wireless personal area network (WPAN). In yet another embodiment, the base station 1014b and the WTRUs 1002c, 1002d may utilize a cellular-based RAT (e.g., WCDMA, CDMA2000, GSM, LTE, LTE-A, etc.) to establish a picocell or femtocell. As shown in FIG. 10A, the base station 1014b may have a direct connection to the Internet 1010. Thus, the base station 1014b may not be required to access the Internet 1010 via the core network 1006.

The RAN 1004 may be in communication with the core network 1006, which may be any type of network configured to provide voice, data, applications, and/or voice over internet protocol (VoIP) services to one or more of the WTRUs 1002a, 1002b, 1002c, 1002d. For example, the core network 1006 may provide call control, billing services, mobile location-based services, pre-paid calling, Internet connectivity, video distribution, etc., and/or perform high-level security functions, such as user authentication. Although not shown in FIG. 10A, it will be appreciated that the RAN 1004 and/or the core network 1006 may be in direct or indirect communication with other RANs that employ the same RAT as the RAN 1004 or a different RAT. For example, in addition to being connected to the RAN 1004, which may be utilizing an E-UTRA radio technology, the core network 1006 may also be in communication with another RAN (not shown) employing a GSM radio technology.

The core network 1006 may also serve as a gateway for the WTRUs 1002a, 1002b, 1002c, 1002d to access the PSTN 1008, the Internet 1010, and/or other networks 1012. The PSTN 1008 may include circuit-switched telephone networks that provide plain old telephone service (POTS). The Internet 1010 may include a global system of interconnected computer networks and devices that use common communication protocols, such as the transmission control protocol (TCP), user datagram protocol (UDP) and the internet protocol (IP) in the TCP/IP internet protocol suite. The networks 1012 may include wired or wireless communications networks owned and/or operated by other service providers. For example, the networks 1012 may include another core network connected to one or more RANs, which may employ the same RAT as the RAN 1004 or a different RAT.

Some or all of the WTRUs 1002a, 1002b, 1002c, 1002d in the communications system 1000 may include multi-mode capabilities, i.e., the WTRUs 1002a, 1002b, 1002c, 1002d may include multiple transceivers for communicating with different wireless networks over different wireless links. For example, the WTRU 1002c shown in FIG. 10A may be configured to communicate with the base station 1014a, which may employ a cellular-based radio technology, and with the base station 1014b, which may employ an IEEE 802 radio technology.

Figure 10B:
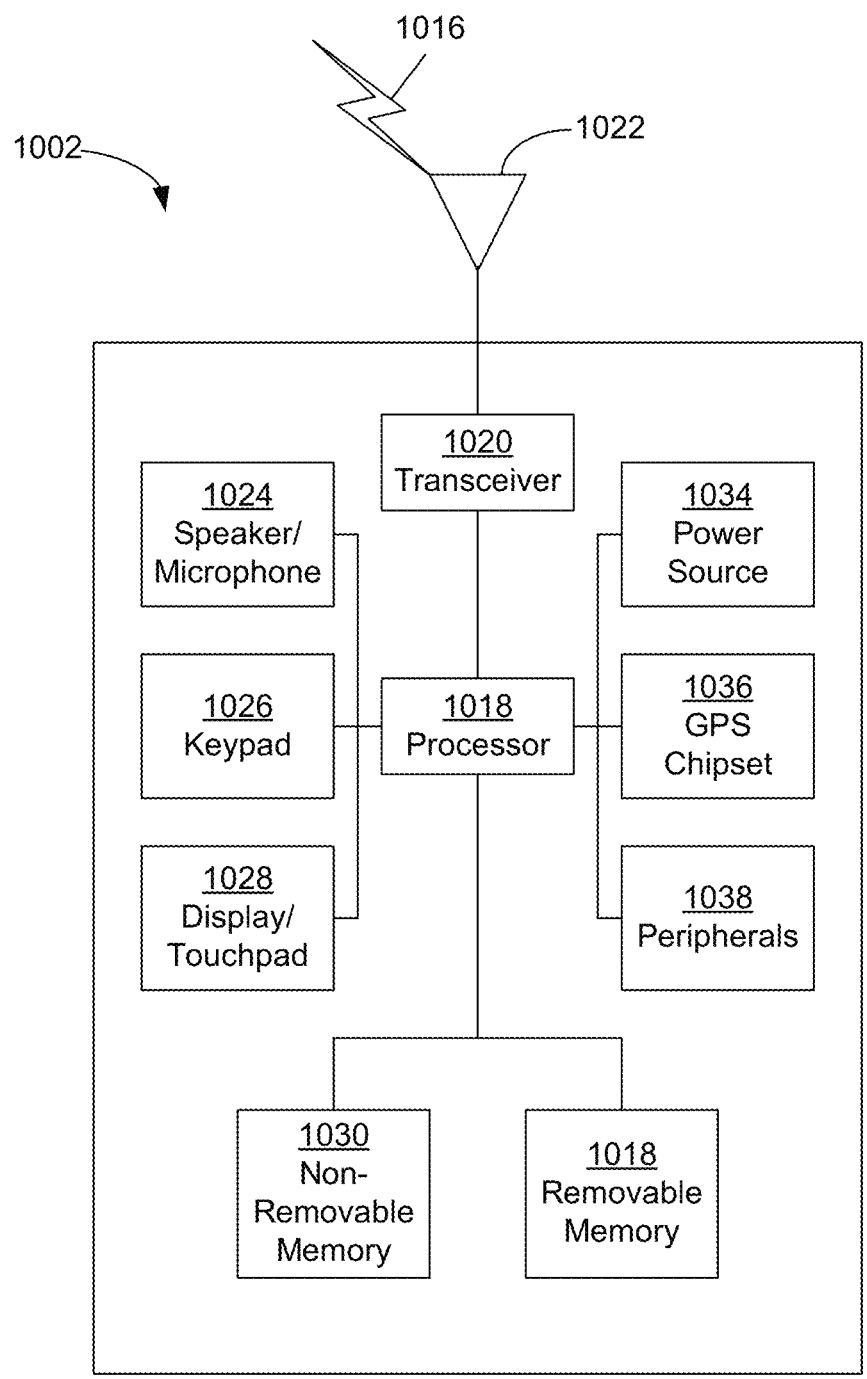
FIG. 10B is a system diagram of an example wireless transmit/receive unit (WTRU) that may be used within the communications system illustrated in FIG. 10A.

FIG. 10B is a system diagram of an example WTRU 1002. As shown in FIG. 10B, the WTRU 1002 may include a processor 1018, a transceiver 1020, a transmit/receive element 1022, a speaker/microphone 1024, a keypad 1026, a presentation unit (e.g., display/touchpad) 1028, non-removable memory 1006, removable memory 1032, a power source 1034, a global positioning system (GPS) chipset 1036, and other peripherals 1038 (e.g., a camera or other optical capturing device). It will be appreciated that the WTRU 1002 may include any sub-combination of the foregoing elements while remaining consistent with an embodiment.

The processor 1018 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1018 may perform signal coding, data processing, power control, input/output processing, and/or any other functionality that enables the WTRU 1002 to operate in a wireless environment. The processor 1018 may be coupled to the transceiver 1020, which may be coupled to the transmit/receive element 1022. While FIG. 10B depicts the processor 1018 and the transceiver 1020 as separate components, it will be appreciated that the processor 1018 and the transceiver 1020 may be integrated together in an electronic package or chip.

The transmit/receive element 1022 may be configured to transmit signals to, or receive signals from, a base station (e.g., the base station 1014a) over the air interface 1016. For example, in one embodiment, the transmit/receive element 1022 may be an antenna configured to transmit and/or receive RF signals. In another embodiment, the transmit/receive element 1022 may be an emitter/detector configured to transmit and/or receive IR, UV, or visible light signals, for example. In yet another embodiment, the transmit/receive element 1022 may be configured to transmit and receive both RF and light signals. It will be appreciated that the transmit/receive element 1022 may be configured to transmit and/or receive any combination of wireless signals.

In addition, although the transmit/receive element 1022 is depicted in FIG. 10B as a single element, the WTRU 1002 may include any number of transmit/receive elements 1022. More specifically, the WTRU 1002 may employ MIMO technology. Thus, in one embodiment, the WTRU 1002 may include two or more transmit/receive elements 1022 (e.g., multiple antennas) for transmitting and receiving wireless signals over the air interface 1016.

The transceiver 1020 may be configured to modulate the signals that are to be transmitted by the transmit/receive element 1022 and to demodulate the signals that are received by the transmit/receive element 1022. As noted above, the WTRU 1002 may have multi-mode capabilities. Thus, the transceiver 1020 may include multiple transceivers for enabling the WTRU 1002 to communicate via multiple RATs, such as UTRA and IEEE 802.11, for example.

The processor 1018 of the WTRU 1002 may be coupled to, and may receive user input data from, the speaker/microphone 1024, the keypad 1026, and/or the presentation unit 1028 (e.g., a liquid crystal display (LCD) display unit or organic light-emitting diode (OLED) display unit). The processor 1018 may also output user data to the speaker/microphone 1024, the keypad 1026, and/or the presentation unit 1028. In addition, the processor 1018 may access information from, and store data in, any type of suitable memory, such as the non-removable memory 1006 and/or the removable memory 1032. The non-removable memory 1006 may include random-access memory (RAM), read-only memory (ROM), a hard disk, or any other type of memory storage device. The removable memory 1032 may include a subscriber identity module (SIM) card, a memory stick, a secure digital (SD) memory card, and the like. In other embodiments, the processor 1018 may access information from, and store data in, memory that is not physically located on the WTRU 1002, such as on a server or a home computer (not shown).

The processor 1018 may receive power from the power source 1034, and may be configured to distribute and/or control the power to the other components in the WTRU 1002. The power source 1034 may be any suitable device for powering the WTRU 1002. For example, the power source 1034 may include one or more dry cell batteries (e.g., nickel-cadmium (NiCd), nickel-zinc (Ni40n), nickel metal hydride (NiMH), lithium-ion (Li-ion), etc.), solar cells, fuel cells, and the like.

The processor 1018 may also be coupled to the GPS chipset 1036, which may be configured to provide location information (e.g., longitude and latitude) regarding the current location of the WTRU 1002. In addition to, or in lieu of, the information from the GPS chipset 1036, the WTRU 1002 may receive location information over the air interface 1016 from a base station (e.g., base stations 1014a, 1014b) and/or determine its location based on the timing of the signals being received from two or more nearby base stations. It will be appreciated that the WTRU 1002 may acquire location information by way of any suitable location-determination method while remaining consistent with an embodiment.

The processor 1018 may further be coupled to other peripherals 1038, which may include one or more software and/or hardware modules that provide additional features, functionality and/or wired or wireless connectivity. For example, the peripherals 1038 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10C:
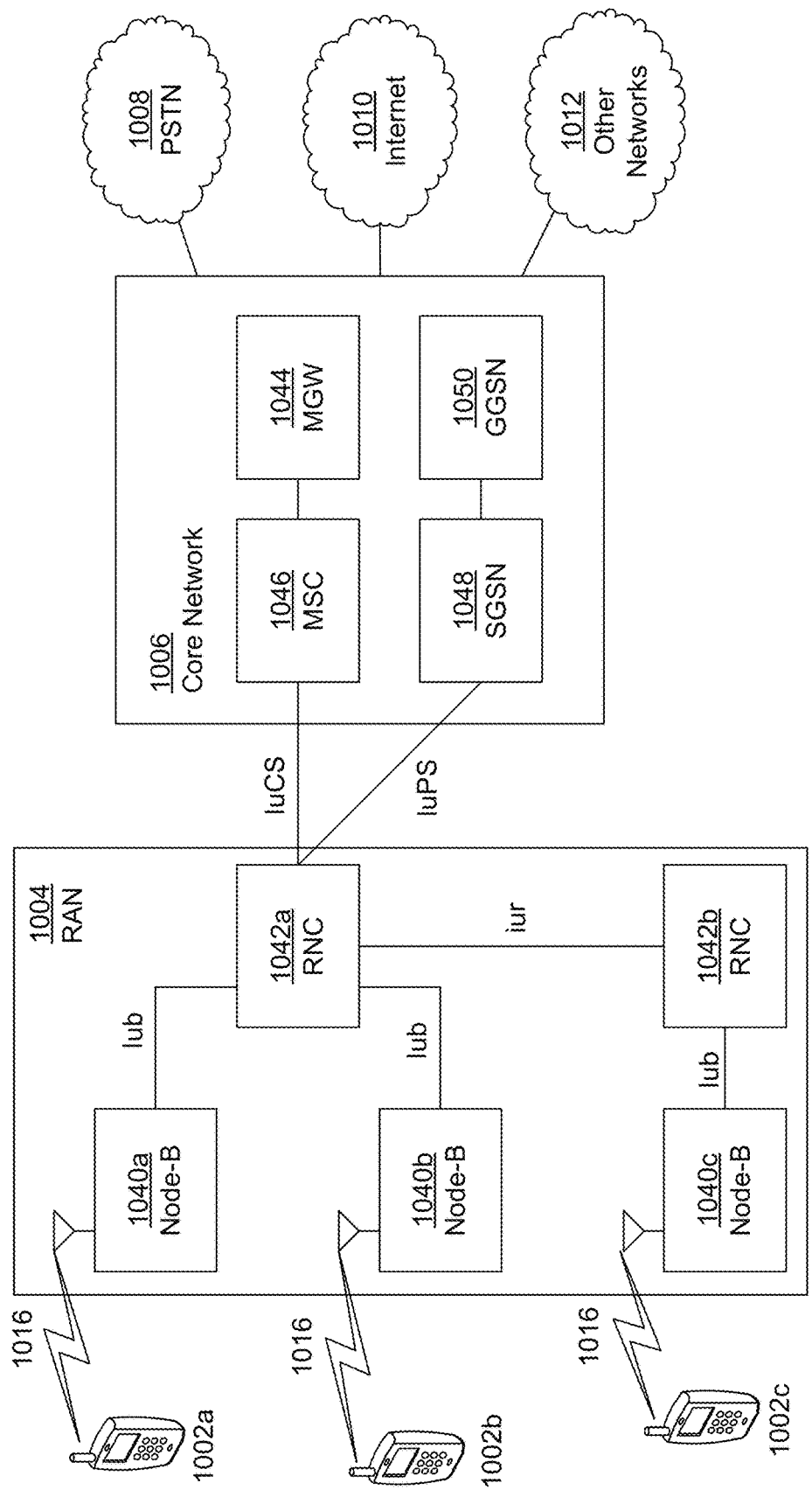
FIGS. 10C, 10D, and 10E are system diagrams of example radio access networks and example core networks that may be used within the communications system illustrated in FIG. 10A.

FIG. 10C is a system diagram of the RAN 1004 and the core network 1006 according to an embodiment. As noted above, the RAN 1004 may employ a UTRA radio technology to communicate with the WTRUs 1002a, 1002b, 1002c over the air interface 1016. The RAN 1004 may also be in communication with the core network 1006. As shown in FIG. 10C, the RAN 1004 may include Node-Bs 1040a, 1040b, 1040c, which may each include one or more transceivers for communicating with the WTRUs 1002a, 1002b, 1002c over the air interface 1016. The Node-Bs 1040a, 1040b, 1040c may each be associated with a particular cell (not shown) within the RAN 1004. The RAN 1004 may also include RNCs 1042a, 1042b. It will be appreciated that the RAN 1004 may include any number of Node-Bs and RNCs while remaining consistent with an embodiment.

As shown in FIG. 10C, the Node-Bs 1040a, 1040b may be in communication with the RNC 1042a. Additionally, the Node-B 1040c may be in communication with the RNC 1042b. The Node-Bs 1040a, 1040b, 1040c may communicate with the respective RNCs 1042a, 1042b via an Iub interface. The RNCs 1042a, 1042b may be in communication with one another via an Iur interface. Each of the RNCs 1042a, 1042b may be configured to control the respective Node-Bs 1040a, 1040b, 1040c to which it is connected. In addition, each of the RNCs 1042a, 1042b may be configured to carry out or support other functionality, such as outer loop power control, load control, admission control, packet scheduling, handover control, macrodiversity, security functions, data encryption, and the like.

The core network 1006 shown in FIG. 10C may include a media gateway (MGW) 1044, a mobile switching center (MSC) 1046, a serving GPRS support node (SGSN) 1048, and/or a gateway GPRS support node (GGSN) 1050. While each of the foregoing elements are depicted as part of the core network 1006, it will be appreciated that any one of these elements may be owned and/or operated by an entity other than the core network operator.

The RNC 1042a in the RAN 1004 may be connected to the MSC 1046 in the core network 1006 via an IuCS interface. The MSC 1046 may be connected to the MGW 1044. The MSC 1046 and the MGW 1044 may provide the WTRUs 1002a, 1002b, 1002c with access to circuit-switched networks, such as the PSTN 1008, to facilitate communications between the WTRUs 1002a, 1002b, 1002c and traditional land-line communications devices.

The RNC 1042a in the RAN 1004 may also be connected to the SGSN 1048 in the core network 1006 via an IuPS interface. The SGSN 1048 may be connected to the GGSN 1050. The SGSN 1048 and the GGSN 1050 may provide the WTRUs 1002a, 1002b, 1002c with access to packet-switched networks, such as the Internet 1010, to facilitate communications between and the WTRUs 1002a, 1002b, 1002c and IP-enabled devices.

As noted above, the core network 1006 may also be connected to the networks 1012, which may include other wired or wireless networks that are owned and/or operated by other service providers.

Figure 10D:
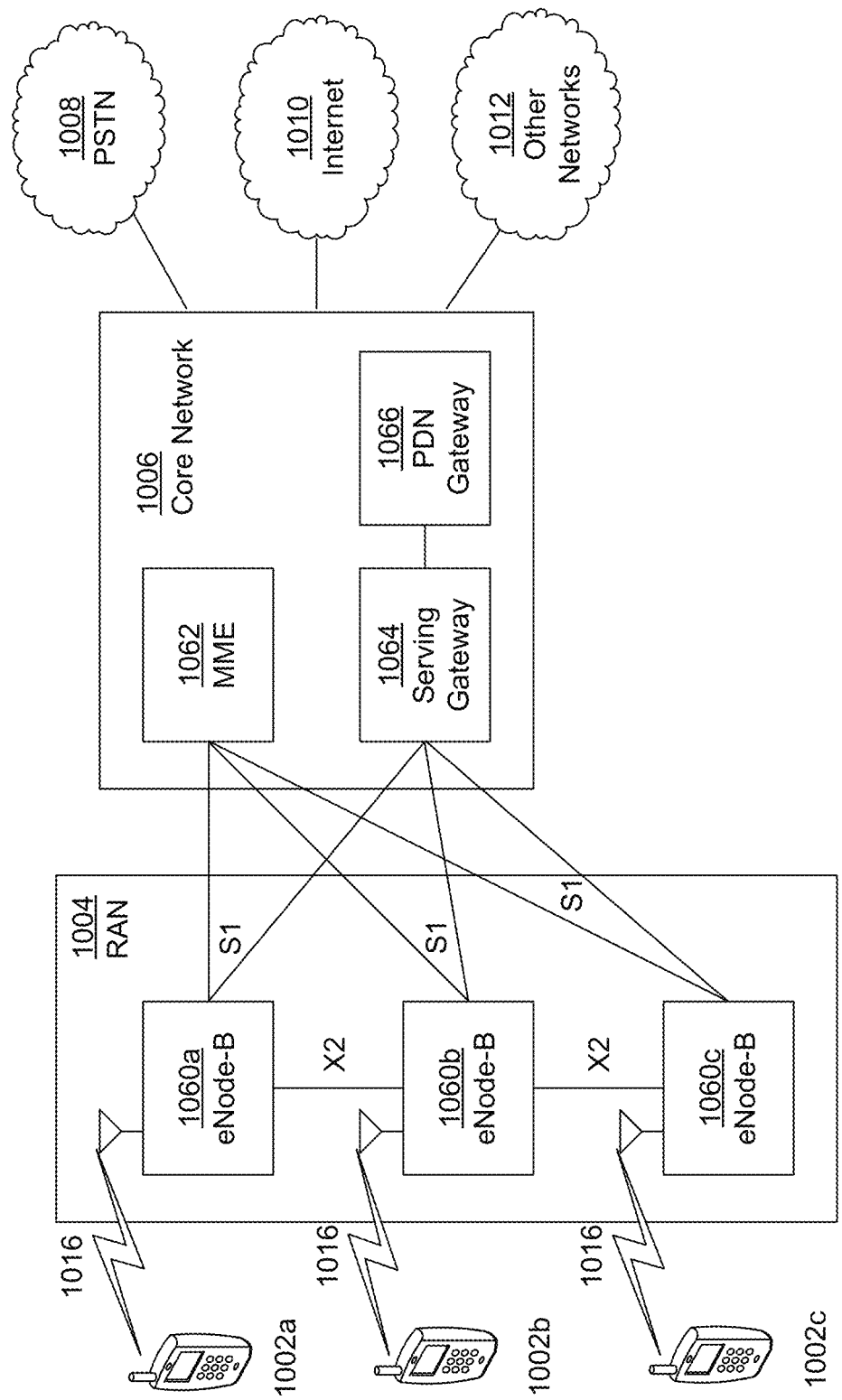

FIG. 10D is a system diagram of the RAN 1004 and the core network 1006 according to another embodiment. As noted above, the RAN 1004 may employ an E-UTRA radio technology to communicate with the WTRUs 1002a, 1002b, 1002c over the air interface 1016. The RAN 1004 may also be in communication with the core network 1006.

The RAN 1004 may include eNode Bs 1060a, 1060b, 1060c, though it will be appreciated that the RAN 1004 may include any number of eNode Bs while remaining consistent with an embodiment. The eNode Bs 1060a, 1060b, 1060c may each include one or more transceivers for communicating with the WTRUs 1002a, 1002b, 1002c over the air interface 1016. In one embodiment, the eNode Bs 1060a, 1060b, 1060c may implement MIMO technology. Thus, the eNode B 1060a, for example, may use multiple antennas to transmit wireless signals to, and receive wireless signals from, the WTRU 1002a.

Each of the eNode Bs 1060a, 1060b, 1060c may be associated with a particular cell (not shown) and may be configured to handle radio resource management decisions, handover decisions, scheduling of users in the uplink and/or downlink, and the like. As shown in FIG. 10D, the eNode Bs 1060a, 1060b, 1060c may communicate with one another over an X2 interface.

The core network 1006 shown in FIG. 10D may include a mobility management gateway (MME) 1062, a serving gateway (SGW) 1064, and a packet data network (PDN) gateway (PGW) 1066. While each of the foregoing elements are depicted as part of the core network 1006, it will be appreciated that any one of these elements may be owned and/or operated by an entity other than the core network operator.

The MME 1062 may be connected to each of the eNode Bs 1060a, 1060b, 1060c in the RAN 1004 via an S1 interface and may serve as a control node. For example, the MME 1062 may be responsible for authenticating users of the WTRUs 1002a, 1002b, 1002c, bearer activation/deactivation, selecting a particular SGW during an initial attach of the WTRUs 1002a, 1002b, 1002c, and the like. The MME 1062 may also provide a control plane function for switching between the RAN 1004 and other RANs (not shown) that employ other radio technologies, such as GSM or WCDMA.

The SGW 1064 may be connected to each of the eNode Bs 1060a, 1060b, 1060c in the RAN 1004 via the S1 interface. The SGW 1064 may generally route and forward user data packets to/from the WTRUs 1002a, 1002b, 1002c. The SGW 1064 may also perform other functions, such as anchoring user planes during inter-eNode B handovers, triggering paging when downlink data is available for the WTRUs 1002a, 1002b, 1002c, managing and storing contexts of the WTRUs 1002a, 1002b, 1002c, and the like.

The SGW 1064 may also be connected to the PGW 1066, which may provide the WTRUs 1002a, 1002b, 1002c with access to packet-switched networks, such as the Internet 1010, to facilitate communications between the WTRUs 1002a, 1002b, 1002c and IP-enabled devices.

The core network 1006 may facilitate communications with other networks. For example, the core network 1006 may provide the WTRUs 1002a, 1002b, 1002c with access to circuit-switched networks, such as the PSTN 1008, to facilitate communications between the WTRUs 1002a, 1002b, 1002c and traditional land-line communications devices. For example, the core network 1006 may include, or may communicate with, an IP gateway (e.g., an IP multimedia subsystem (IMS) server) that serves as an interface between the core network 1006 and the PSTN 1008. In addition, the core network 1006 may provide the WTRUs 1002a, 1002b, 1002c with access to the networks 1012, which may include other wired or wireless networks that are owned and/or operated by other service providers.

Figure 10E:
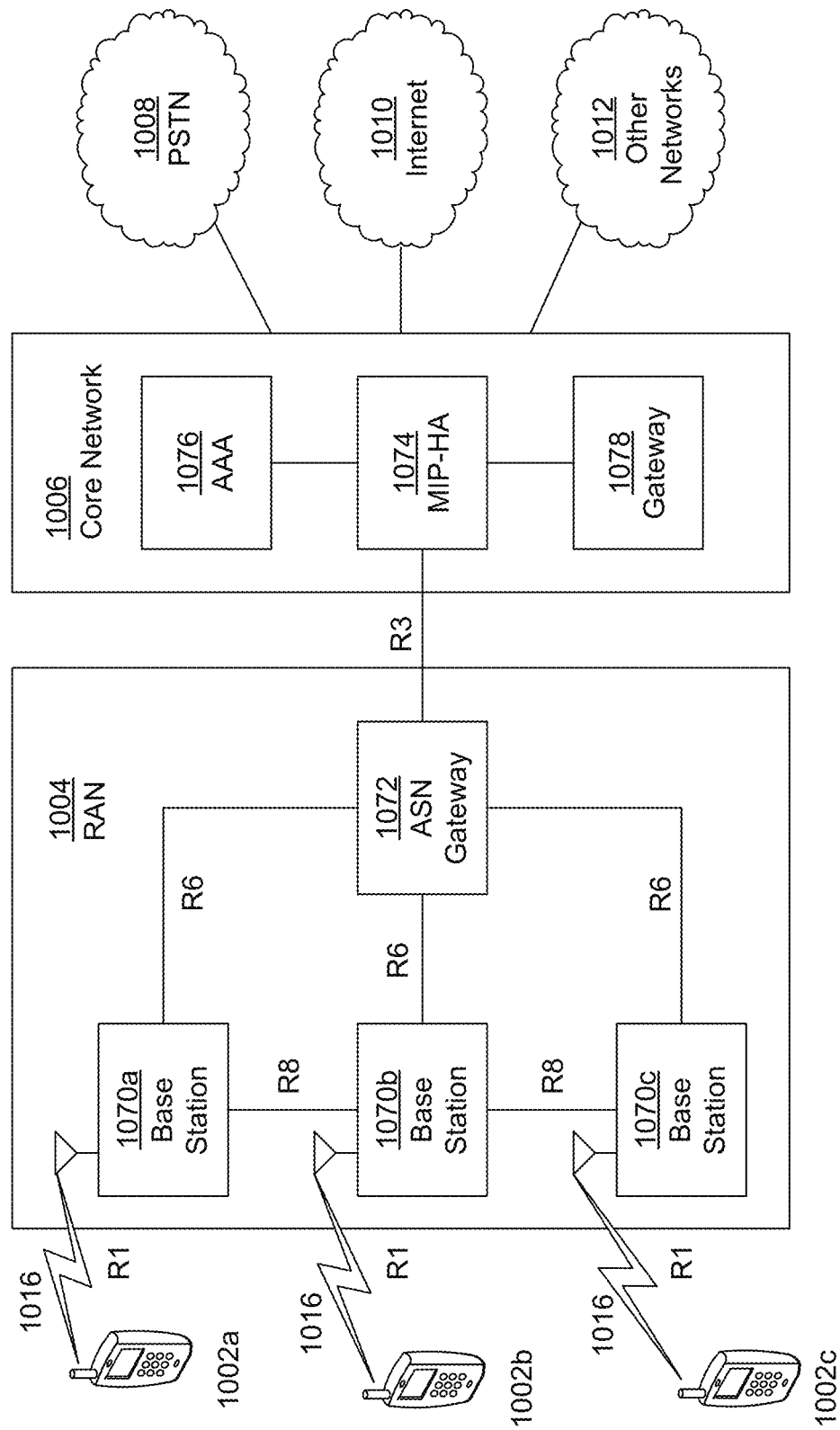

FIG. 10E is a system diagram of the RAN 1004 and the core network 1006 according to another embodiment. The RAN 1004 may be an access service network (ASN) that employs IEEE 802.16 radio technology to communicate with the WTRUs 1002a, 1002b, 1002c over the air interface 1016. As will be further discussed below, the communication links between the different functional entities of the WTRUs 1002a, 1002b, 1002c, the RAN 1004, and the core network 1006 may be defined as reference points.

As shown in FIG. 10E, the RAN 1004 may include base stations 1070a, 1070b, 1070c, and an ASN gateway 1072, though it will be appreciated that the RAN 1004 may include any number of base stations and ASN gateways while remaining consistent with an embodiment. The base stations 1070a, 1070b, 1070c may each be associated with a particular cell (not shown) in the RAN 1004 and may each include one or more transceivers for communicating with the WTRUs 1002a, 1002b, 1002c over the air interface 1016. In one embodiment, the base stations 1070a, 1070b, 1070c may implement MIMO technology. Thus, the base station 4070a, for example, may use multiple antennas to transmit wireless signals to, and receive wireless signals from, the WTRU 4002a. The base stations 1070a, 1070b, 1070c may also provide mobility management functions, such as handoff triggering, tunnel establishment, radio resource management, traffic classification, quality of service (QoS) policy enforcement, and the like. The ASN gateway 4072 may serve as a traffic aggregation point and may be responsible for paging, caching of subscriber profiles, routing to the core network 1006, and the like.

The air interface 1016 between the WTRUs 1002a, 1002b, 1002c and the RAN 1004 may be defined as an R1 reference point that implements the IEEE 802.16 specification. In addition, each of the WTRUs 1002a, 1002b, 1002c may establish a logical interface (not shown) with the core network 1006. The logical interface between the WTRUs 1002a, 1002b, 1002c and the core network 1006 may be defined as an R2 reference point, which may be used for authentication, authorization, IP host configuration management, and/or mobility management.

The communication link between each of the base stations 1070a, 1070b, 1070c may be defined as an R8 reference point that includes protocols for facilitating WTRU handovers and the transfer of data between base stations. The communication link between the base stations 1070a, 1070b, 1070c and the ASN gateway 1072 may be defined as an R6 reference point. The R6 reference point may include protocols for facilitating mobility management based on mobility events associated with each of the WTRUs 1002a, 1002b, 1002c.

As shown in FIG. 10E, the RAN 1004 may be connected to the core network 1006. The communication link between the RAN 14 and the core network 1006 may defined as an R3 reference point that includes protocols for facilitating data transfer and mobility management capabilities, for example. The core network 1006 may include a mobile IP home agent (MIP-HA) 1074, an authentication, authorization, accounting (AAA) server 1076, and a gateway 1078. While each of the foregoing elements are depicted as part of the core network 1006, it will be appreciated that any one of these elements may be owned and/or operated by an entity other than the core network operator.

The MIP-HA 1074 may be responsible for IP address management, and may enable the WTRUs 1002a, 1002b, 1002c to roam between different ASNs and/or different core networks. The MIP-HA 1074 may provide the WTRUs 1002a, 1002b, 1002c with access to packet-switched networks, such as the Internet 1010, to facilitate communications between the WTRUs 1002a, 1002b, 1002c and IP-enabled devices. The AAA server 1076 may be responsible for user authentication and for supporting user services. The gateway 1078 may facilitate interworking with other networks. For example, the gateway 1078 may provide the WTRUs 1002a, 1002b, 1002c with access to circuit-switched networks, such as the PSTN 1008, to facilitate communications between the WTRUs 1002a, 1002b, 1002c and traditional land-line communications devices. In addition, the gateway 1078 may provide the WTRUs 1002a, 1002b, 1002c with access to the networks 1012, which may include other wired or wireless networks that are owned and/or operated by other service providers.

Although not shown in FIG. 10E, it will be appreciated that the RAN 1004 may be connected to other ASNs and the core network 1006 may be connected to other core networks. The communication link between the RAN 1004 the other ASNs may be defined as an R4 reference point, which may include protocols for coordinating the mobility of the WTRUs 1002a, 1002b, 1002c between the RAN 1004 and the other ASNs. The communication link between the core network 1006 and the other core networks may be defined as an R5 reference, which may include protocols for facilitating interworking between home core networks and visited core networks.

Various methods, apparatus, systems, devices, and computer program products directed to augmenting reality with respect to real-world objects (e.g., signs), and/or real-world scenes that include real-world objects (e.g., by way of an augmented-reality presentation and/or user interface) may be provided and/or used. Such methods, apparatus, systems, devices, and computer program products may be modified to be directed to augmenting reality with respect to real-world places, and/or real-world scenes that include real-world places, (e.g., by substituting the terms real-world places for the terms real-world signs).

For example, among the examples provided herein, the methods, apparatus, systems, devices, and computer program products may include a method directed to augmenting reality via a device (e.g., using or via a presentation unit). In various examples, the method may include any of: identifying a real-world place (e.g., along a route being navigated and/or being traversed); and adapting an appearance of the real-world place ("real-world-place appearance") by augmenting a real-world view that includes the real-world place.

In various examples, adapting the real-world-place appearance may include emphasizing, or de-emphasizing, the real-world-place appearance. Both emphasizing and de-emphasizing the real-world-place appearance may be carried out by augmenting one or more portions of the real-world view associated with, or otherwise having connection to, the real-world place and/or the real-world scene (e.g., portions neighboring the real-world place). Emphasizing the real-world-place appearance draws attention to the real-world place and/or to some portion of the real-world place. De-emphasizing the real-world place appearance obscures the real-world place (e.g., makes it inconspicuous and/or unnoticeable).

Also among the examples provided herein by way of modifying the methods, apparatus, systems, devices, and computer program products provided may be method directed to augmenting reality via the presentation unit, which, in various embodiments, may include any of: identifying a real-world place (e.g., along a route being navigated and/or being traversed); making a determination of whether the real-world place is relevant and/or familiar ("relevancy/familiarity determination"); and adapting the real-world-place appearance by augmenting a real-world view that includes the real-world place based, at least in part, on the relevancy/familiarity determination.

In examples, adapting the real-world-place appearance may be based, and/or conditioned, on the real-world place being (determined to be) relevant and/or familiar. In other various examples, adapting the real-world-place appearance may be based, and/or conditioned, on the real-world place being (determined to be) not relevant and/or familiar. And among the various ways to adapt the real-world-place appearance are to emphasize or to de-emphasize its appearance. In examples, among the possible embodiments, the real-world-place appearance may be (i) de-emphasized based, and/or conditioned, on the real-world place being relevant; and/or (ii) emphasized based, and/or conditioned, on the real-world place being not relevant.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A device for augmenting a real-world scene in view of a user, comprising:
    a processor configured to:
        determine a real-world place in the real-world scene based on a location associated with the user;
        determine a previously captured photographic image that depicts the real-world place, wherein the previously captured photographic image that depicts the real-world place is determined based on the location associated with the user;
        determine a familiarity score associated with how familiar the user is with the previously captured photographic image that depicts the real-world place, wherein the determination of the familiarity score is based at least on a determination of an amount of instances the user interacted with media associated with the previously captured photographic image that depicts the real-world place;
        determine that the familiarity score is above a threshold;
        determine to overlay the previously captured photographic image that depicts the real-world place over at least a part of the real-world place in the real-world scene based at least on the determination that the familiarity score is above the threshold and the location associated with the user; and
        display, via the device, the previously captured photographic image that depicts the real-world place overlaid over at least the part of the real-world place in the real-world scene.

2. The device of claim 1, wherein the familiarity score is further based on at least one of:
    an amount of times or occasions the user viewed the previously captured photographic image that depicts the real-world place;
    a tracked social relationship between the user and a person whose device captured the previously captured photographic image that depicts the real-world place;
    an amount of times the user interacted with the previously captured photographic image that depicts the real-world place;
    an amount of time spent by the user viewing the previously captured photographic image that depicts the real-world place;
    an amount of time spent by the user with media associated with the previously captured photographic image that depicts the real-world place; or
    an amount of time spent by the user with media associated with the previously captured photographic image that depicts the real-world place after viewing the previously captured photographic image that depicts the real-world place.

3. The device of claim 1, wherein the familiarity score is further based on one or more environmental conditions, and wherein the one or more environmental conditions comprise at least one of: a lighting condition, a weather condition, a time of day, or a season.

4. The device of claim 1, wherein the previously captured photographic image that depicts the real-world place depicts the real-world place under a first environmental condition, and wherein the real-world place in the real-world scene is associated with a second environmental condition.

5. The device of claim 4, wherein the first environmental condition is a daylight condition and the second environmental condition is a nighttime condition.

6. The device of claim 1, wherein the processor is further configured to determine the familiarity score based on assigning a weight to an amount of user interaction with the previously captured photographic image that depicts the real-world place.

7. The device of claim 1, wherein the previously captured photographic image that depicts the real-world place is associated with a person who is connected to the user on a social media site.

8. The device of claim 1, wherein the real-world place is an object in the real-world scene, and wherein the previously captured photographic image that depicts the real-world place is an image that depicts the object.

9. The device of claim 8, wherein the object is a physical object visible in the real-world scene.

10. The device of claim 8, wherein the object is a physical object that is obscured in the real-world scene.

11. The device of claim 1, wherein the device further comprises a unit, wherein the unit allows the user to perceive the real-world scene through or via the unit.

12. A method of augmenting a real-world scene in view of a user of a device, comprising:
 determining a real-world place in the real-world scene based on a location associated with the user;
 determining a previously captured photographic image that depicts the real-world place, wherein the previously captured photographic image that depicts the real-world place is determined based on the location associated with the user;
 determining a familiarity score of how familiar the user is with the previously captured photographic image that depicts the real-world place, wherein the determination of the familiarity score is based at least on a determination of an amount of instances the user interacted with media associated with the previously captured photographic image that depicts the real- world place;
 determining that the familiarity score is above a threshold;
 determining to overlay the previously captured photographic image that depicts the real- world place over at least a part of the real-world place in the real-world scene based at least on determination that the the familiarity score is above the threshold and the location associated with the user; and
 displaying, via the device, the previously captured photographic image that depicts the real-world place overlaid over at least the part of the real-world place in the real-world scene.

13. The method of claim 12, wherein the previously captured photographic image that depicts the real-world place is from a social media site.

14. A device for augmenting a real-world scene in view of a user and associated with following directions or navigation instructions for a route being navigated, comprising:
 a processor configured to:
  determine a real-world place in the real-world scene based on a location of the user;
  determine a previously captured photographic image that depicts the real-world place, wherein the previously captured photographic image that depicts the real-world place is determined based on the location of the user;
  determine a familiarity score of how familiar the user is with the previously captured photographic image that depicts the real-world place, wherein the determination of the familiarity score is based at least on an amount of instances the user interacted with media associated with the previously captured photographic image that depicts the real-world place;
  determine that the familiarity score is above a threshold;
  determine to overlay the previously captured photographic image that depicts the real-world place over at least a part of the real-world place based at least on the determination that the familiarity score is above the threshold and the location of the user; and
  display, on the device, the previously captured photographic image that depicts the real-world place overlaid over at least the part of the real-world place.

15. The device of claim 14, wherein the familiarity score is based on at least one of:
 an amount of times or occasions the user viewed the previously captured photographic image that depicts the real-world place;
 a tracked social relationship between the user and a person whose device captured the previously captured photographic image that depicts the real-world place;
 an amount of times the user interacted with the previously captured photographic image that depicts the real-world place;
 an amount of times the user interacted with media associated with the previously captured photographic image that depicts the real-world place after viewing the previously captured photographic image that depicts the real-world place;
 an amount of time spent by the user viewing the previously captured photographic image that depicts the real-world place;
 an amount of time spent by the user with media associated with the previously captured photographic image that depicts the real-world place; or an amount of time spent by the user with media associated with the previously captured photographic image that depicts the real-world place after viewing the previously captured photographic image that depicts the real-world place.

16. The device of claim 15, wherein the familiarity score is further based on an environmental condition comprising at least one of: a lighting condition, a weather condition, a time of day, or a season.

17. The device of claim 14, wherein the processor is further configured to determine the familiarity score based on assigning a weight to an amount of user interaction with the previously captured photographic image that depicts the real-world place and the amount of instances the user interacted with media associated with the previously captured photographic image that depicts the real-world place.

18. The device of claim 14, wherein the previously captured photographic image that depicts the real-world place depicts the real-world place under a first environmental condition, and wherein the real-world place in the real-world scene is associated with a second environmental condition.

* * * * *